US 7,047,316 B2

(12) United States Patent
Iwata et al.

(10) Patent No.: US 7,047,316 B2
(45) Date of Patent: May 16, 2006

(54) LINK STATE ROUTING TECHNIQUES

(75) Inventors: Atsushi Iwata, Tokyo (JP); Hirokazu Takatama, Tokyo (JP)

(73) Assignee: NEC Corporation, Tokyo (JP)

( * ) Notice: Subject to any disclaimer, the term of this patent is extended or adjusted under 35 U.S.C. 154(b) by 896 days.

(21) Appl. No.: 09/814,854

(22) Filed: Mar. 23, 2001

(65) Prior Publication Data

US 2001/0029543 A1    Oct. 11, 2001

(30) Foreign Application Priority Data

Mar. 24, 2000    (JP) .............................. 2000-083558

(51) Int. Cl.
*G06F 15/13* (2006.01)
(52) U.S. Cl. ..................... 709/240; 370/238; 370/351
(58) Field of Classification Search ................ 709/225, 709/240; 370/238, 351, 356, 357; 379/900
See application file for complete search history.

(56) References Cited

U.S. PATENT DOCUMENTS

| 5,845,091 | A | * | 12/1998 | Dunne et al. ............... 709/240 |
| 5,933,425 | A | * | 8/1999 | Iwata ......................... 370/351 |
| 6,542,468 | B1 | * | 4/2003 | Hatakeyama ............... 370/238 |
| 6,633,544 | B1 | * | 10/2003 | Rexford et al. ............. 370/238 |
| 6,687,229 | B1 | * | 2/2004 | Kataria et al. .............. 370/238 |

FOREIGN PATENT DOCUMENTS

| JP | 5-130144 | 5/1993 |
| JP | 9-36 873 | 2/1997 |
| JP | 9-116573 | 5/1997 |
| JP | 2723097 | 11/1997 |
| JP | 10-65733 | 3/1998 |
| JP | 10-135980 | 5/1998 |
| JP | 10-154979 | 6/1998 |
| JP | 10-164074 | 6/1998 |
| JP | 11-252106 | 9/1999 |
| JP | 2000-174755 | 6/2000 |

OTHER PUBLICATIONS

"ATM Routing Algorithms with Multiple QOS Requirements for Multimedia Internetworking" (IEICE, Transactions on Communications, vol. E79-B. No. 8. pp 999-1007, Aug. 1996).

"Source-Oriented Topology Aggregation with Multiple QoS parameters in Hierarchical ATM Networks" (IEEE/IFIPIWQoS'99 pp. 137-146, Jun. 1999).

(Continued)

*Primary Examiner*—John Follansbee
*Assistant Examiner*—Jinsong Hu
(74) *Attorney, Agent, or Firm*—McGinn IP Law Group, PLLC

(57) ABSTRACT

A link state routing communication device allowing path precalculation satisfying the required quality of a connection and reducing the call blocking probability is disclosed. A path satisfying a connection request can be selected from a plurality of precalculated paths which are stored for each destination in a memory. The precalculated paths reflect the latest link resource information using the feasibility check operation or precalculated path update operation. Therefore, a blocking probability of connection setup using precalculated paths can be decreased. In a border node, summarized information is calculated based on precalculated paths and therefore high-speed summarized information calculation is allowed, resulting in reduced computation load.

20 Claims, 16 Drawing Sheets

OTHER PUBLICATIONS

Japanese Office Action dated Oct. 8, 2003 with Partial English Translation.
Norihito Fujita, et al., "QoS Control with MPLS over ATM Model", *The Institute of Electronics, Information and Communication Engineers*, Mar. 19, 1999, pp. 81-86.
European Search Report dated Apr. 13, 2004.
Nina Taft-Plotkin, et al., "QoS-Routing in ATM Networks", Aug. 1998, XP-002273503.
Nina Taft-Plotkin, et al., "Quality-of-Service Routing Using Maximally Disjoint Paths", IEEE, XP-010335391, May 31, 1999, pp. 119-128.
Atsushi Iwata, et al., "PNNI Routing Algorithms for Multimedia ATM Internet", vol. 38, No. 1, 1997, pp. 60-73, XP 000694589.
Ariel Orda, et al., "QoS Routing: The Precomputation Perspective", Proceedings IEEE Infocom 2000, vol. 3 of 3, Mar. 26, 2000, pp. 128-136, XP-001004241.
Shigang Chen, et al., "An Overview of Quality of Service Routing for Next-Generation High-Speed Networks: Problems and Solutions", IEEE Networks, vol. 12, No. 6, Nov. 1998, pp. 64-79, XP-000873129.
Hui Xie, et al., "Performance Analysis of PNNI Routing In ATM Networks: Hierarchical Reduced Load Approximation", 1997 IEE, Nov. 2, 1997, pp. 998-1002, XP010260807.
E. Crawley, et al., RFC 2386: A Framework for QoS-based Routing in the Internet, IETF RFC, Aug. 1998, XP-002219363.
European Search Report dated Sep. 13, 2004.
Plet Van Mieghem, "Topology Information condensation in hierarchical networks", Computer Networks, Elsevier Science Publishers B.V., Amsterdam, NL, vol. 31, No. 20, Sep. 27, 1999, pp. 2115-2137, XP004304619 ISSN: 1309-1286.
Whay C. Lee, "Topology Aggregation for Hierarchical Routing in ATM Networks", Computer Communication Review, Association For Computing Machinery. New York, US, vol. 25, No. 2, Apr. 1, 1995, pp. 82-92, XP000570739 ISSN: 0146-4833.
"Private Network-Network Interface Specification Version 1.0 (PNNI 1.0), af-pnni-0055.000", ATM Forum Technical Committee, Mar. 1996, pp. 1-190, XP002247350.
Atsushi Iwata, et al., "QOS aggregation algorithms in hierarchical ATM networks", Communications, 1998. ICC 98. Conference Record. 1998 IEEE International Conference on Atlanta, GA, USA Jun. 7-11, 1998, New York, NY, USA, IEEE, US, Jun. 7, 1998, pp. 243-248, XP010284456 ISBN: 0-7803-4788-9.
Peyravian M. et al., "Network path caching:—Issues, algorithms and a simulation study", Computer Communications, Elsevier Science Publishers BV, Amsterdam, NL, vol. 20, No. 8, Aug. 25, 1997, pp. 605-614, XP004126714 ISSN: 0140-3664.
Apostolopoulos G. et al., "On reducing the processing cost of on-demand QoS path computation", Network Protocols, 1998. Proceedings. Sixth International Conference On Austin, TX, USA Oct. 13-16, 1998, Los Alamitos, CA, USA, IEEE Comput. Soc, US, Oct. 13, 1998, pp. 80-89, XP010309351 ISBN: 0-8186-8988-9.
Srihari Nelakuditi, et al., "Quality-of-Service Routing without Global Information Exchange", Quality of Service, 1999, IWQOS '99. 1999 Seventh International Workshop on London, UK May 31-Jun. 4, 1999, Piscataway, NJ, USA, IEEE, US, May 31, 1999, pp. 129-131, XP010335383 ISBN: 0-7803-5671-3.
Liang Guo et al., "On State Aggregation for Scalable QoS Routing", ATM Workshop Proceedings, 1998 IEEE Fairfax, VA, USA May 26-29, 1998, New York, NY, USA, IEEE, US, May 26, 1998, pp. 306-314, XP010280535 ISBN: 0-7803-4874-5.
Anees Shaikh et al., "Efficient Precomputation of Quality-of-Service Routes", Workshop on Network and Operating Systems Support for Digital Audio and Video, Jul. 1998, XP002290856.
Atsushi Iwata, et al., "ATM Routing Algorithms with Multiple QOS Requirements for Multimedia Internetworking", IEICE Transactions on Communications, Institute of Electronics Infomation and Comm. Eng. Tokyo, JP, vol. E79-B, No. 8, Aug. 1, 1996, pp. 999-1007, XP000628636 ISSN: 0916-8516.
Crawley, et al., "RFC 2386: A Framework for QoS-based Routing in the Internet", IETF RFC, Aug. 1998, pp. 1-37, XP002219363, retrieved from the Internet: URL:ftp://ftp.isi.edu/in-notes/rfc2386.txt.
Hui Xie et al., "Performance Analysis of PNNI Routing in ATM Networks: Hierarchical Reduced Load Approximation", MILCOM 97 Proceedings Monterey, CA, USA Nov. 2-5, 1997, New York, NY, USA, IEEE, US, Nov. 2, 1997, pp. 998-1002, XP010260807 ISBN: 0-7803-4249-6.
Shigang Chen et al., "An Overview of Quality of Service Routing for Next-Generation High-Speed Networks: Problems and Solutions", IEEE Network, IEEE Inc. New York, US, vol. 12, No. 6, Nov. 1998, pp. 64-79, XP000873129 ISSN: 0890-8044.
Ariel Orda, et al., "QoS Routing: The Precomputation Perspective", Proceedings IEEE INFOCOM 2000. The Conference on Computer Communications. 19th. Annual Joint Conference of the IEEE Computer and Communications Societies. Tel Aviv, Israel, Mar. 26-30, 2000, Proceedings IEEE INFOCOM. The Conference on Computer COMMU, vol. 3 of 3, Conf. 19, Mar. 26, 2000, pp. 128-136, XP001004241 ISBN: 0-7803-5881-3.
Nina Taft-Plotkin et al., "Quality-of-Service Routing Using Maximally Disjoint Paths", Quality of Service, 1999. IWQOS '99. 1999 Seventh International Workshop on London, UK May 31-Jun. 4, 1999, Piscataway, NJ, USA, IEEE, US, May 31, 1999, pp. 119-128, XP010335391 ISBN: 0-7803-5671-3.
Nina Taft-Plotkin, et al., "QoS-Routing in ATM Networks", SRI International, Aug. 1998, XP002273503.

* cited by examiner

FIG.3A
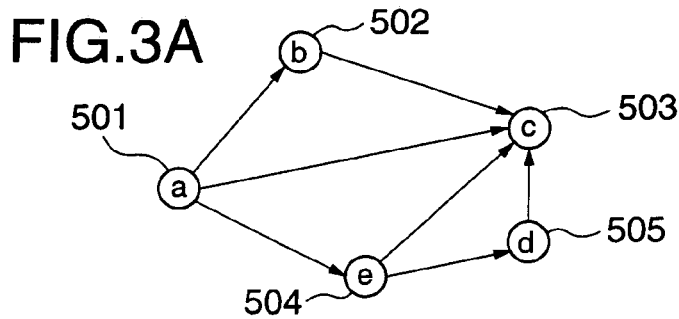
FIG.3B
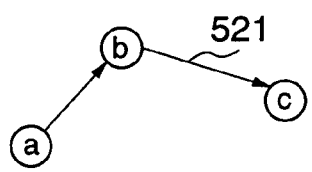
FIG.3C
FIG.3D
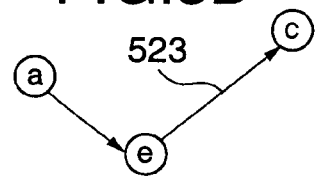
FIG.3E
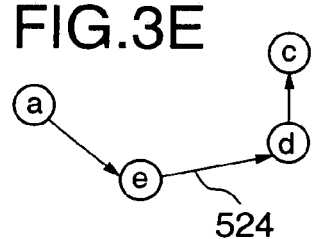
FIG.3F
| LINK TOPOLOGY | LINK RESOURCE | |
|---|---|---|
| | DELAY | AVAILABLE BW |
| a b | 3 msec | 30 Mbps |
| a c | 3 msec | 60 Mbps |
| a e | 1 msec | 50 Mbps |
| b c | 4 msec | 80 Mbps |
| d c | 2 msec | 50 Mbps |
| e c | 1 msec | 30 Mbps |
| e d | 3 msec | 60 Mbps |
511
FIG.3G
| DESTINATION | PRECALCULATED PATH TOPOLOGY | PRECALCULATED PATH RESOURCE | |
|---|---|---|---|
| | | DELAY | AVAILABLE BW |
| c | a b c | 7 msec | 80 Mbps |
| | a c | 3 msec | 60 Mbps |
| | a e c | 2 msec | 30 Mbps |
| | a e d c | 6 msec | 50 Mbps |
531

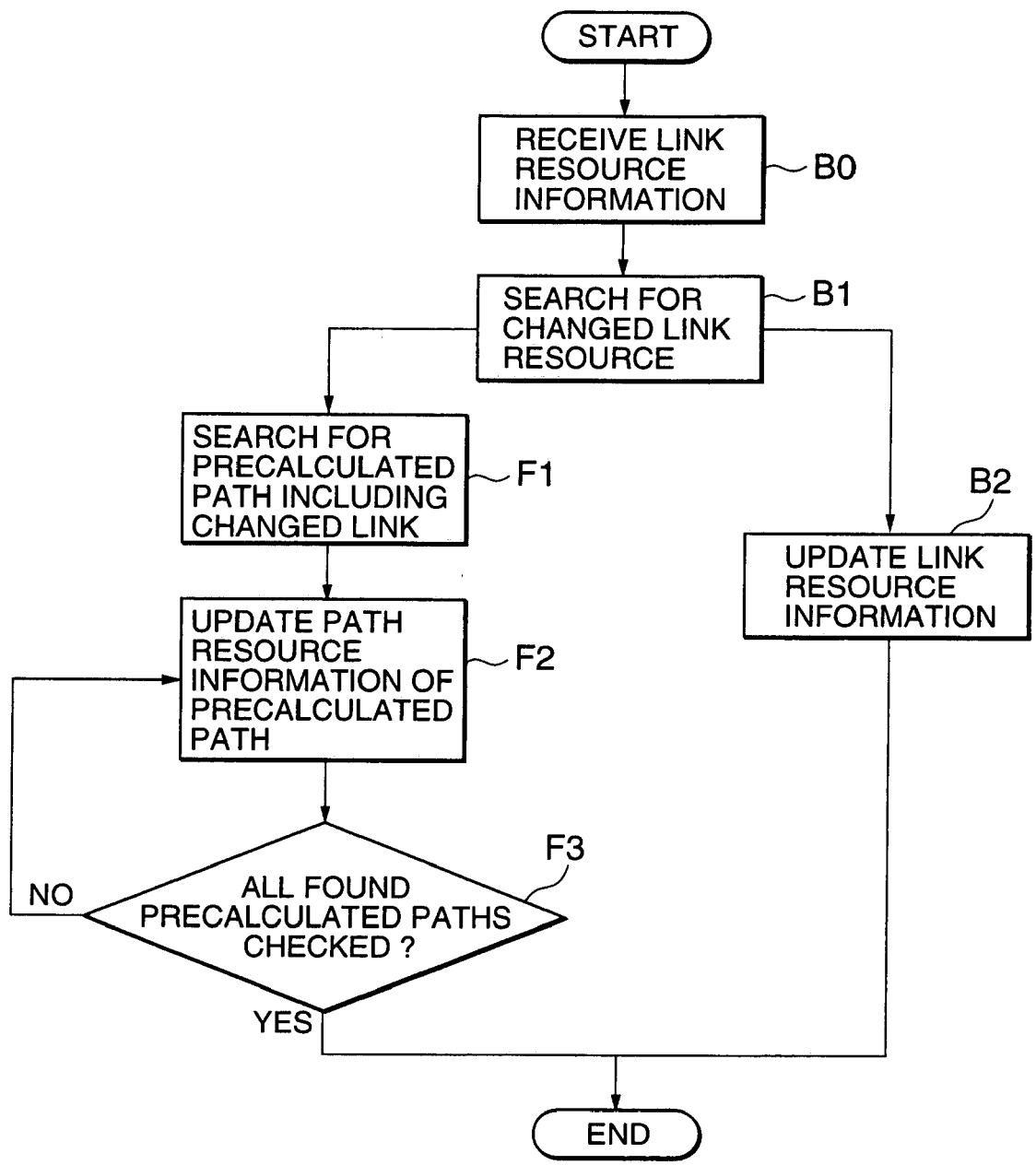

| LINK | DESTINATION | PRECALCULATED PATH TOPOLOGY | PRECALCULATED PATH RESOURCE | |
|---|---|---|---|---|
| | | | DELAY | AVAILABLE BW |
| (a, c) | b | a c b | 7 msec | 60 Mbps |
| | c | a c | 3 msec | 60 Mbps |
| | d | a c d | 5 msec | 50 Mbps |
| | e | a c e<br>a c d e | 4 msec<br>8 msec | 30 Mbps<br>50 Mbps |

| LINK | LINK RESOURCE | |
|---|---|---|
| | DELAY | AVAILABLE BW |
| a, c | 3 msec → 5 msec | 60 Mbps → 40 Mbps |

| LINK | DESTINATION | PRECALCULATED PATH TOPOLOGY | PRECALCULATED PATH RESOURCE | |
|---|---|---|---|---|
| | | | DELAY | AVAILABLE BW |
| (a, c) | b | a c b | 9 msec | 40 Mbps |
| | c | a c | 5 msec | 40 Mbps |
| | d | a c d | 7 msec | 40 Mbps |
| | e | a c e<br>a c d e | 6 msec<br>10 msec | 30 Mbps<br>40 Mbps |

| PRECALCULATED PATH | NUMBER OF HOPS | AVAILABLE BW |
|---|---|---|
| a | 3 | 100 Mbps |
| b | | 50 Mbps |
| c | | 10 Mbps |
| d | 4 | 200 Mbps |
| e | | 150 Mbps |
| f | | 20 Mbps |
| g | 5 | 250 Mbps |
| h | | 200 Mbps |
| i | | 100 Mbps |

FIG.14A
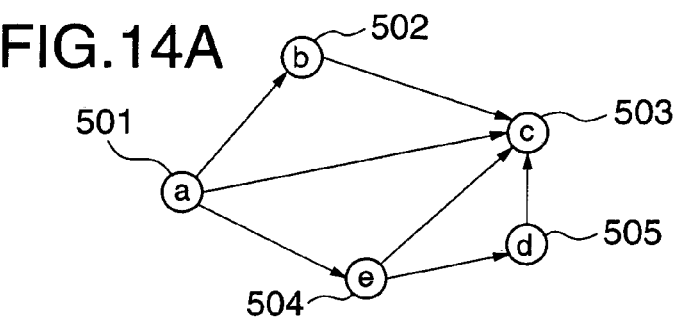
FIG.14B
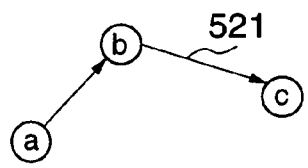
FIG.14D
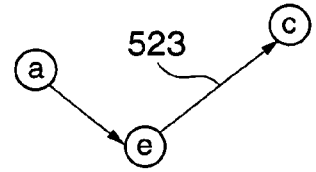
FIG.14C
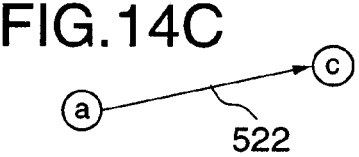
FIG.14E
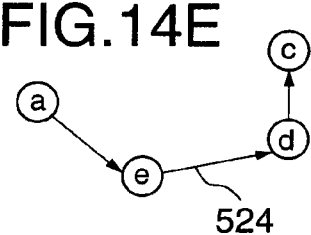
FIG.14F
| LINK TOPOLOGY | LINK RESOURCE | |
| --- | --- | --- |
| | DELAY | AVAILABLE BW |
| a b | 3 msec | 30 Mbps |
| a c | 3 msec | 60 Mbps |
| a e | 1 msec | 50 Mbps |
| b c | 4 msec | 80 Mbps |
| d c | 2 msec | 50 Mbps |
| e c | 1 msec | 30 Mbps |
| e d | 3 msec | 60 Mbps |
FIG.14G
| DESTINATION | PRECALCULATED PATH TOPOLOGY | PRECALCULATED PATH RESOURCE | |
| --- | --- | --- | --- |
| | | DELAY | AVAILABLE BW |
| c | a b c | 7 msec | 80 Mbps |
| | a c | 3 msec | 60 Mbps |
| | a e c | 2 msec | 30 Mbps |
| | a e d c | 6 msec | 50 Mbps |

| POLICY | SUMMARIZED LINK | SUMMARIZED LINK RESOURCE INFORMATION | |
| --- | --- | --- | --- |
| | | DELAY | AVAILABLE BW |
| BEST | | 2 msec | 80 Mbps |
| WORST | a c | 7 msec | 30 Mbps |
| LINEAR INTERPOLATION | | 7-5x msec | 30+50x Mbps |

| LINK | LINK RESOURCE | |
|---|---|---|
| | DELAY | AVAILABLE BW |
| a e | 1 msec → 3 msec | 50 Mbps → 20 Mbps |

| DESTINATION | PRECALCULATED PATH TOPOLOGY | PRECALCULATED PATH RESOURCE | |
|---|---|---|---|
| | | DELAY | AVAILABLE BW |
| c | a b c<br>a c<br>a e c<br>a e d c | 7 msec<br>3 msec<br>2 msec → 4 msec<br>6 msec → 8 msec | 80 Mbps<br>60 Mbps<br>30 Mbps → 20 Mbps<br>50 Mbps → 20 Mbps |
| d | a b c d<br>a c d<br>a e d<br>a e c d | 9 msec<br>5 msec<br>4 msec → 6 msec<br>4 msec → 6 msec | 30 Mdps<br>50 Mdps<br>50 Mbps → 20 Mbps<br>30 Mbps → 20 Mbps |

| SUMMARIZED LINK | SUMMARIZED LINK RESOURCE INFORMATION | | CHANGE RATE | |
|---|---|---|---|---|
| | DELAY | AVAILABLE BW | DELAY | AVAILABLE BW |
| a c | 2 msec → 3 msec | 80 Mbps | 33% | 0% |
| | 7 msec → 8 msec | 30 Mbps → 20 Mbps | 13% | 50% |
| a d | 4 msec → 5 msec | 50 Mbps | 20% | 0% |
| | 9 msec | 30 Mbps → 20 Mbps | 0% | 50% |

583

LINK STATE ROUTING TECHNIQUES

BACKGROUND OF THE INVENTION

1. Field of the Invention

The present invention relates to link state routing techniques in a network which is structured into single-level or multi-level hierarchy, and in particular to a link state routing device and method for determining an optimal path using topology information and quality-of-service (QoS) information of the entire network, which are obtained by exchanging route information including link or nodal topology information and QoS information between single peer group nodes or hierarchical peer group nodes in the network.

2. Description of the Related Art

A QoS routing algorithm for finding a path that guarantees QoS parameters requested by users has been proposed by IWATA et al. "ATM Routing Algorithms with Multiple QoS Requirements for Multimedia Internetworking" (IEICE Transactions on Communications, Vol. E79-B. No. 8. pp 999–1007. August 1996).

More specifically, the QoS routing algorithm includes a precalculated path approach and an on-demand calculated path approach. When receiving a connection setup request from a user, the precalculated path approach is performed to search a precalculated path resource information memory for a candidate path satisfying the QoS requirement of the connection setup request. If such a candidate path is found, then the connection is set up. Contrarily, when not found, the connection setup request is supplied to the on-demand calculated path approach.

The on-demand calculated path approach calculates a path satisfying the QoS requirement of the connection setup request based on link resource information stored in a link resource information memory. When such a path is found, then the connection is set up. Contrarily, when not found, the connection setup request is finally rejected.

The link resource information memory stores link resource information such as available bandwidth and delay for each link. When receiving link resource information from another node, it is determined whether any change in link resource information occurs in the link resource information memory. If any link resource information is changed, then the corresponding link resource information is updated.

In the case of a large hierarchical network, a border communication device is needed to exchange summarized link resource information between different-level nodes. Such a border communication device for link state routing has been proposed by Korkmaz et al. "Source-Oriented Topology Aggregation with Multiple QoS parameters in Hierarchical ATM Networks" (IEEE/IFIP IWQoS'99, pp. 137–146, June 1999).

More specifically, such a border communication device is provided with a summarized information computation means. When the contents of a link resource information memory has been updated, the summarized information computation means summarizes network status of nodes in its own level while referring to the updated contents of the link resource information memory. The summarized information is sent to another level of the hierarchy.

There have been proposed various communication devices similar to the above communication devices. For example, Japanese Patent No. 2723097 discloses a QoS routing device capable of selecting a path satisfying all the QoS requirements of a connection setup request. Japanese Patent Application unexamined Publication No. 11-252106 discloses a connection path changing device capable of re-establishing a connection so as to get around a designated node after connection establishment. Japanese Patent Application Unexamined Publication No. 10-164074 discloses an ATM network system capable of searching for a connection path satisfying QoS when routing in the network and also reducing the load of connection setup. Japanese Patent Application Unexamined Publication No. 10-135980 discloses a connection setup device avoiding causing an established connection to degrade the quality thereof and allowing rapid recovery of the connection. Japanese Patent Application Unexamined Publication No. 10-154979 discloses a point-to-multipoint connection method for setting up a point-to-multipoint call by selecting an economical connection path in a broad-band communications network.

A combination of path precalculation and dynamic route search employed in the conventional link-state routing devices as described above has disadvantages that there is often the case where a precalculated path satisfying the connection quality requirement is not found. The reason is that only a single precalculated path is used for each destination, resulting in a few candidate paths. This increases the number of times a path is dynamically calculated and thereby increases the load.

In addition, since the precalculated path information fails to reflect the latest path information, there is a high probability of connection setup failure.

As for the border communication device as described above, calculation of summarized information needs the high computing power because it is necessary to search the entire network of its own and repeatedly perform calculation with accuracy.

Further, the summarized information is sent to another level of the hierarchy every time when the network status of its own is updated. Therefore, the amount of packet data is increased, which may cause network congestion.

SUMMARY OF THE INVENTION

An object of the present invention is to provide a link state routing communication device allowing path precalculation satisfying the required quality of a connection and reducing the call blocking probability.

Another object of the present invention is to provide a link state routing communication device allowing summarized information to be calculated at high speed and with reduced computation load.

Still another object of the present invention is to provide a link state routing communication device allowing the reduced amount of summarized information sent to the network.

According to the present invention, a link state routing device of a node in a network composed of a plurality of nodes and links, includes: a first memory for storing link resource information for each link in the network, wherein the link resource information is updated as occasion arises; a path calculator for calculating a plurality of precalculated paths for each destination based on link resource information stored in the first memory, independently of occurrence of a connection request; a second memory for storing the precalculated paths for each destination and path resource information for each precalculated path; and a path selector for selecting a precalculated path from the precalculated paths stored in the second memory when a connection request occurs, wherein the precalculated path is selected so as to satisfy quality requirement of the connection request.

The path selector may include: a precalculated path searcher for searching the second memory for a precalculated path candidate satisfying quality requirement of the connection request; and a feasibility checker for checking whether the precalculated path candidate is a feasible path, by referring to link resource information stored in the first memory, wherein, when the precalculated path candidate is an infeasible path, the precalculated path searcher searches the second memory for another precalculated path candidate.

The path selector may further include: an on-demand path searcher for searching the first memory for a path candidate satisfying quality requirement of the connection request received, wherein, when a precalculated path candidate satisfying quality requirement of the connection request received is not found, the on-demand path searcher is activated.

The link state routing device may further include: an updater for updating path resource information of a precalculated path stored in the second memory when link resource information of a link included in the precalculated path is updated.

According to another aspect of the present invention, a link state routing device of a node in a network composed of a plurality of nodes and links, includes: a first memory for storing link resource information for each link in the network, wherein the link resource information is updated as occasion arises; a path calculator for calculating a plurality of precalculated paths for each destination based on link resource information stored in the first memory, independently of occurrence of a connection request; a second memory for storing the precalculated paths for each destination and path resource information for each precalculated path; a path selector for selecting a precalculated path from the precalculated paths stored in the second memory when a connection request occurs, wherein the precalculated path is selected so as to satisfy quality requirement of the connection request; a connection setup attempter for attempting connection setup of the precalculated path; a first counter for counting number of path selection occurrences in the path selector; a second counter for counting number of path blocking occurrences in the connection setup attempter; a blocking rate calculator for calculating a blocking rate based on the number of path selection occurrences and the path blocking occurrences; and a controller controlling the path calculator such that, when the blocking rate is not smaller than a predetermined threshold, the path calculator recalculates a plurality of precalculated paths for each destination based on link resource information stored in the first memory.

The path selector may include: a precalculated path searcher for searching the second memory for a precalculated path candidate satisfying quality requirement of the connection request; and a feasibility checker for checking whether the precalculated path candidate is a feasible path, by referring link resource information stored in the first memory, wherein, when the precalculated path candidate is an infeasible path, the precalculated path searcher searches the second memory for another precalculated path candidate.

According to still another aspect of the present invention, a link state routing device of a node in a network composed of a plurality of nodes and links, includes: a first memory for storing link resource information for each link in the network, wherein the link resource information is updated as occasion arises; a path calculator for calculating a plurality of precalculated paths for each destination based on link resource information stored in the first memory, independently of occurrence of a connection request; a second memory for storing the precalculated paths for each destination and path resource information for each precalculated path; a path selector for selecting a precalculated path from the precalculated paths stored in the second memory when a connection request occurs, wherein the precalculated path is selected so as to satisfy quality requirement of the connection request; an updater for updating path resource information of a precalculated path stored in the second memory when link resource information of a link included in the precalculated path is updated; and a controller controlling the path calculator such that, when the updated link resource information of the link is not smaller than a predetermined link quality threshold, the path calculator recalculates a plurality of precalculated paths for each destination exclusive of the updated link resource information of the link.

A communication device of a border node for link state routing in hierarchical networks, includes: a first memory for storing link resource information for each link in the network, wherein the link resource information is updated as occasion arises; a path calculator for calculating a plurality of precalculated paths for each destination based on link resource information stored in the first memory, independently of occurrence of a connection request; a second memory for storing the precalculated paths for each destination and path resource information for each precalculated path, and a summarized information calculator for calculating summarized information from the precalculated paths for each destination and path resource information for each precalculated path.

The summarized information calculator may include: an update link detector for detecting a precalculated path including an updated link, wherein the summarized information calculator recalculates only summarized information of a precalculated path including the updated link.

A communication device of a border node for link state routing in hierarchical networks, includes: a first memory for storing link resource information for each link in the network, wherein the link resource information is updated as occasion arises; a summarized information calculator for calculating summarized information based on the link resource information for each link stored in the first memory; a change rate calculator for calculating a change rate between new link resource information currently received from another node and the link resource information stored in the first memory, that was previously sent to a different-level node; and a summarized information transmitter for transmitting the summarized information to a different-level node when a calculated change rate is greater than a predetermined threshold.

As described above, according to the present invention, a path satisfying a connection request can be selected from a plurality of precalculated paths which are stored for each destination. Therefore, a high-speed connection setup can be achieved without re-calculating a path when a connection request occurs.

Since the precalculated paths reflect the latest link resource information using the feasibility check section or precalculated path update section, a blocking probability of connection setup using precalculated paths can be decreased.

In a border node, summarized information is calculated based on precalculated paths and therefore high-speed summarized information calculation is allowed, resulting in reduced computation load.

In addition, calculation and transmission of summarized information are controlled depending on a change rate of summarized information. Therefore, the amount of summarized information transferred in the network can be reduced and a sequence of processes regarding reception of summarized information at different-level nodes can be omitted.

BRIEF DESCRIPTION OF THE DRAWINGS

FIG. 3A is a diagram showing an example of possible network routes for explanation of an operation of the first embodiment;

FIGS. 3B–3E are diagrams showing precalculated paths for explanation of the first embodiment;

FIG. 3F is a diagram showing a link resource information table for explanation of the first embodiment;

FIG. 3G is a diagram showing a precalculated path information table for explanation of the first embodiment;

FIG. 5 is a flow chart showing an operation of the second embodiment;

FIG. 6A is a diagram showing a precalculated path information table for explanation of an operation of the second embodiment;

FIG. 6B is a diagram showing a change of resource information for explanation of an operation of the second embodiment;

FIG. 6C is a diagram showing an updated precalculated path information table for explanation of an operation of the second embodiment;

FIG. 7 is a diagram showing a precalculated path table used in a hierarchically weighted round robin scheme;

FIG. 14A is a diagram showing an example of possible network routes for explanation of an operation of the fifth embodiment;

FIGS. 14B–14E are diagrams showing precalculated paths for explanation of the fifth embodiment;

FIG. 14F is a diagram showing a link resource information table for explanation of the fifth embodiment;

FIG. 14G is a diagram showing a precalculated path information table for explanation of the fifth embodiment;

FIG. 18A is a diagram showing a table containing link resource information of the link a-e in the level for explanation of an operation of the further embodiment;

FIG. 18B is a diagram showing a table containing information about a first precalculated path from node 501 to node 503 and a second precalculated path from node 501 to node 505 in operation of the further embodiment; and FIG. 18C is a diagram showing a table containing summarized information of the level for explanation of an operation of the second embodiment.

DESCRIPTION OF THE PREFERRED EMBODIMENTS

Hereafter, link state routing communication devices and link state routing border communication devices will be described in detail.

First Embodiment

A link state routing communication device according to a first embodiment of the present invention is designed to be used in a single peer group.

Figure 1:
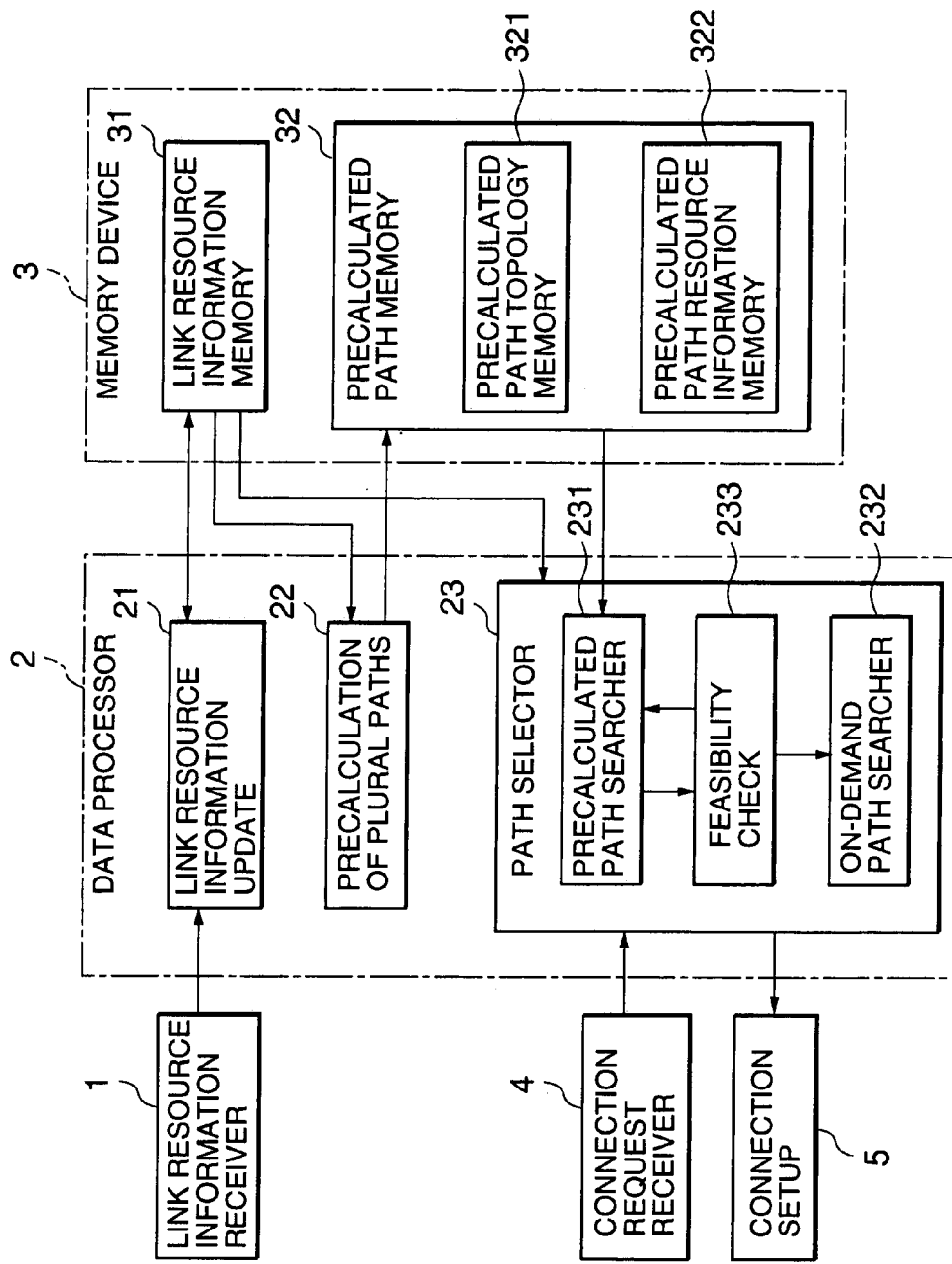
FIG. 1 is a block diagram showing a link state routing communication device according to a first embodiment of the present invention.

Referring to FIG. 1, the link state routing communication device is provided with a link resource information receiver 1, a data processor 2, a memory device 3, a connection request receiver 4, and a connection setup section 5. The link resource information receiver 1 receives link resource information from another communication device and outputs it to the data processor 2. The connection request receiver 4 receives a connection request including the destination and required connection quality of a call from a user and outputs it to the data processor 2. The data processor 2 performs a link state routing operation using the memory device 3 when receiving a connection request from the connection request receiver 4. The connection setup section 5 sets up a connection to the destination of the received connection request under control of the data processor 2.

The data processor 2 is a program-controlled processor on which the following sections are implemented: link resource information update section 21, plural-path precalculation section 22, and a path searcher 23 including precalculated path searcher 231, on-demand path searcher 232; and feasibility check section 233. The memory device 3 includes link resource information memory 31 and precalculated path memory 32 including precalculated path topology memory 321 and precalculated path resource information memory 322.

The link resource information memory 31 stores link resource information received from another communication device in the network. Link resource information may be available bandwidth and delay information on a link.

The precalculated path topology memory 321 stores as path topology a collection of node and links on a precalculated path to a destination.

The precalculated path resource information memory 322 stores path resource information corresponding to each path topology stored in the precalculated path topology memory 321. Taking an available bandwidth on a path as an example of path resource, the path resource information indicates a minimum available bandwidth among the links on the path. The path resource information stored in the precalculated path resource information memory 322 is updated when the link resource information stored in the link resource information memory 31 is updated. Alternatively, it is periodically updated independently of the link resource information stored in the link resource information memory 31.

The link resource information update section 21 updates the link resource information stored in the link resource information memory 31 when a change of corresponding link resource information is detected by comparing the received link resource information from the link resource information receiver 1 with the stored link resource information in the link resource information memory 31.

The plural-path precalculation section 22 calculates a plurality of paths from its own device to the destination of the received connection request before accepting the connection request. The precalculation is performed using the link resource information stored in the link resource information memory 31. The path topology information and the resource information of each of the precalculated paths are registered into the precalculated path topology memory 321 and the precalculated path resource information memory 322, respectively. Since a plurality of precalculated paths are registered, it is possible to rapidly find an optimal precalculated path satisfying QoS requirements of the received connection request, resulting in the decreased number of times a path is dynamically re-calculated.

The precalculated path searcher 231, when receiving a connection request, searches the precalculated path resource information memory 322 for a precalculated path candidate satisfying the QoS requirements using the destination and the connection quality of the received connection request as a search key.

The feasibility check section 233 checks whether each link oil the found precalculated path satisfies the required connection quality by referring to the stored link resource information in the link resource information memory 31. As described before, the precalculated paths stored in the precalculated path memory 32 do not always reflect the latest link resource status. Therefore, if only the precalculated paths stored in the precalculated path memory 32 are used to set up a connection, a call blocking probability becomes high. According to the first embodiment, the feasibility check section 233 is used to determine whether each line on the found precalculated path satisfies the required connection quality, resulting in substantially reduced call blocking probability.

The on-demand path searcher 232 calculates a path satisfying the required connection quality of the received connection request based on the link resource information stored in the link resource information memory 31.

Operation

Next, a link state routing operation according to the first embodiment will be described with reference to FIG. 2.

Figure 2:
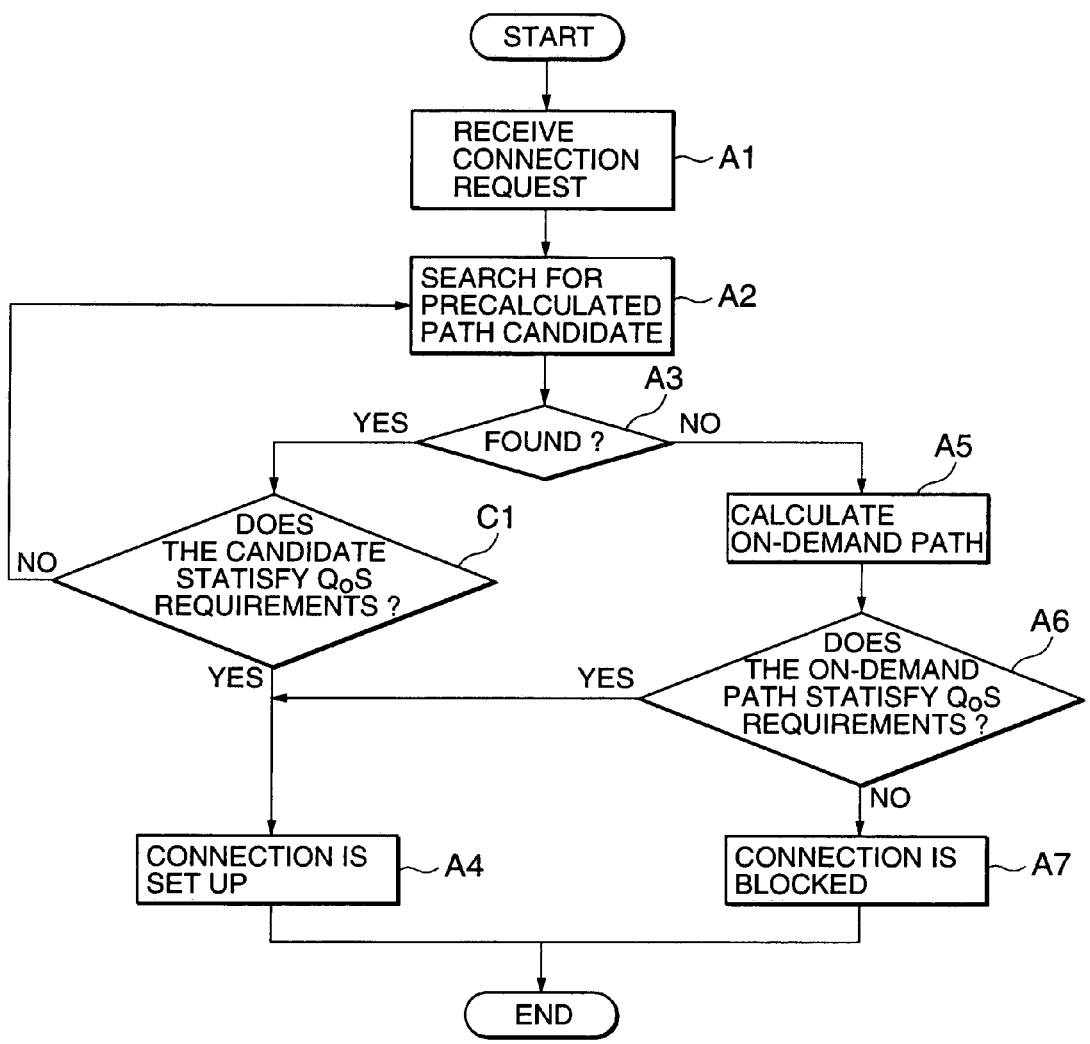
FIG. 2 is a flow chart showing an operation of the first embodiment.

Referring to FIG. 2, when receiving a connection request (step A1), the precalculated path searcher 231 searches the precalculated path topology memory 321 for a precalculated path to the destination of the received connection request. Thereafter, the precalculated path searcher 231 searches the precalculated path resource information memory 322 for a precalculated path candidate satisfying the required connection quality using the destination and the connection quality of the received connection request as a search key (step A2).

When no candidate is found (NO at step A3), the on-demand path searcher 232 calculates an on-demand path satisfying the required connection quality of the received connection request based on the link resource information stored in the link resource information memory 31 (step A5). When such an on-demand path is found (YES at step A6), it is output to the connection setup section 5 and the connection is set up (step A4). When such an on-demand path is not found (NO at step A6), the connection is blocked (step A7).

On the other hand, when a precalculated path candidate satisfying the required connection quality is found (YES at step A3), it is output to the feasibility check section 233. The feasibility check section 233 checks whether each link on the found path candidate satisfies the required connection quality by referring to the stored link resource information in the link resource information memory 31 (step C1). When the found path candidate satisfies the required connection quality (YES at step C1), it is output to the connection setup section 5 and the connection is set up (step A4). When the found path candidate does not satisfy the required connection quality (NO at step C1), control goes back to the step A2 so as to select another precalculated path candidate.

EXAMPLE

As shown in FIGS. 3A–3E, it is assumed for simplicity that a single peer group consists of five nodes 501–505 (see FIG. 3A) and four precalculated paths 521–524 from the node 501 to the node 503 are considered (see FIGS. 3B–3E).

In this case, the link resource information memory 31 of the node 501 stores a link resource information table 511 as shown in FIG. 3F and the precalculated path memory 32 thereof stores a precalculated path information table 531 as shown in FIG. 3G. Referring to FIG. 3F, a link a-b, for example, has a delay of 3 msec and an available bandwidth (BW) of 30 Mbps. Referring to FIG. 3G, a precalculated path a-b-c, for example, is shown to have a delay of 7 msec and an available bandwidth of 80 Mbps.

The plural-path precalculation section 22 periodically updates the precalculated path information table 531 by referring to the link resource information table 511.

Assuming that the connection request receiver 4 receives a connection request for a connection to the node 503 of BW=50 Mbps and delay$\leq$8 msec, the precalculated path searcher 231 searches the precalculated path information table 531 for a precalculated path satisfying the connection request. In this case, the precalculated path searcher 231 finds the precalculated path 521, that is, a-b-c, which is indicated to have a bandwidth of 80 Mbps and a delay of 7 msec (see FIG. 3G).

As described before, the contents of the precalculated path information table 531 are updated at regular intervals. Therefore, when the precalculated path searcher 231 accesses the precalculated path information table 531, there is a possibility that the precalculated path information has not reflected the latest network status. To avoid this, the feasibility check section 233 checks whether each line on the precalculated path 521 satisfies the required connection quality.

More specifically, the precalculated path 521 consists of two links a-b and b-c as shown in FIG. 3B. Referring to the link resource information table 511 of FIG. 3F, the link a-b has 30 Mbps, which does not satisfy the required bandwidth of 50 Mbps (NO at step C1 of FIG. 2). Accordingly, the feasibility check section 233 instructs the precalculated path searcher 231 to select another precalculated path candidate.

Referring to FIG. 3F, the precalculated path searcher 231 selects as a next candidate the precalculated path 522: a-c. Referring to the link resource information table 511 of FIG. 3F, the link a-c is shown to have a bandwidth of 60 Mbps and a delay of 3 msec, which satisfies the requirements of BW=50 Mbps and delay≦8 msec (YES at step C1 of FIG. 2). Accordingly, the feasibility check section 233 determines that the precalculated path 522 is feasible. Then, the precalculated path 522 is output to the connection setup section 5 and the connection following the precalculated path 522 is set up.

As described above, the plural-path precalculation section 22 registers a plurality of precalculated paths in the precalculated path memory 32. Therefore, it is possible to rapidly find an optimal precalculated path satisfying QoS requirements of the received connection request with higher probability, resulting in the decreased number of times a path is dynamically re-calculated and thereby reduced computation load on the communication device.

Further, the feasibility check section 233 uses the latest link resource information table to determine whether each line on the found precalculated path satisfies the required connection quality. Therefore, a probability of successfully setting up a connection becomes higher, resulting in reduced call blocking probability.

Second Embodiment

A link state routing communication device according to a second embodiment of the present invention is designed to be used in a single peer group.

Figure 4:
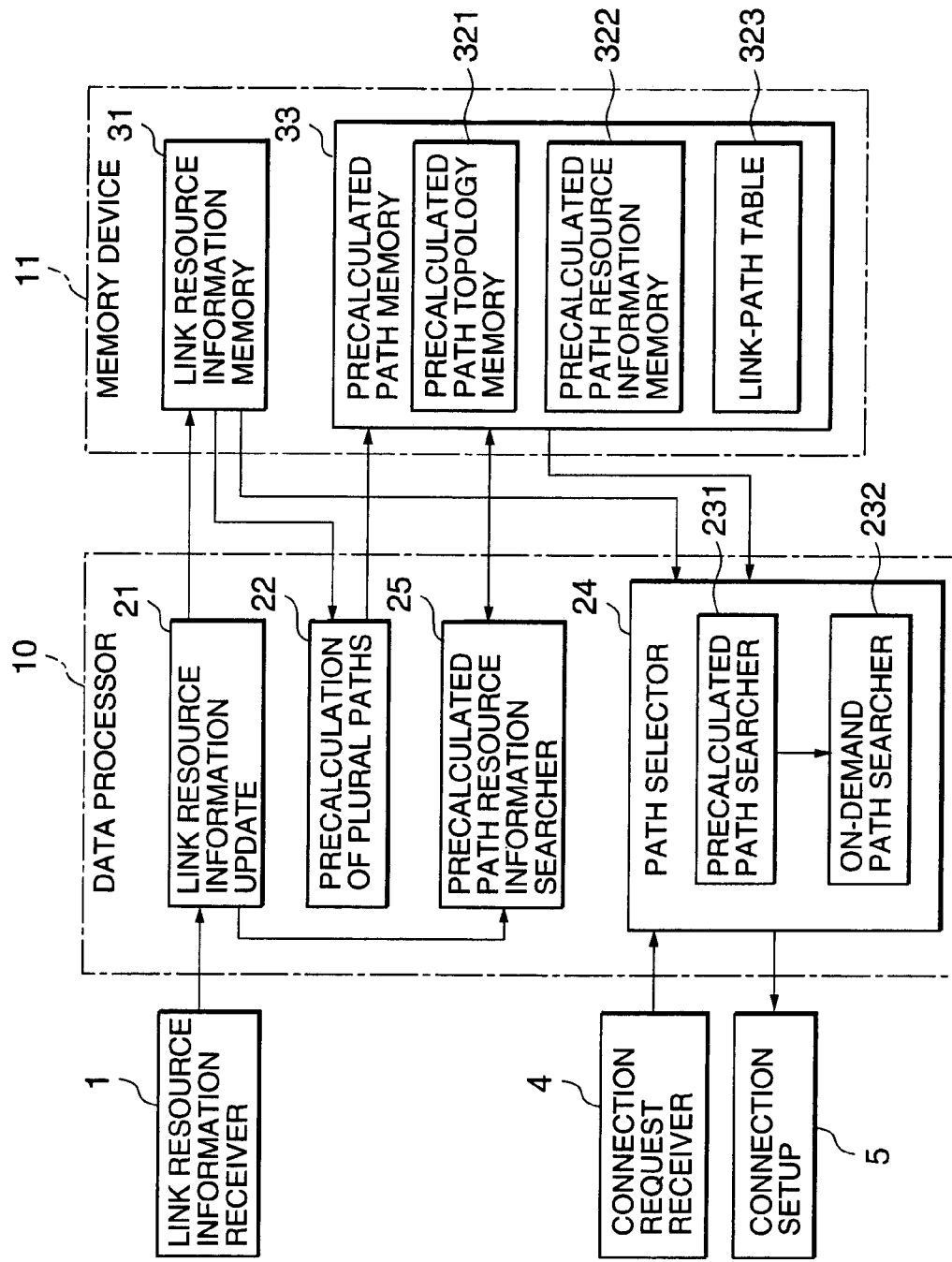
FIG. 4 is a block diagram showing a link state routing communication device according to a second embodiment of the present invention.

Referring to FIG. 4, the link state routing communication device is provided with a link resource information receiver 1, a data processor 10, a memory device 11, a connection request receiver 4, and a connection setup section 5, wherein circuit blocks similar to those previously described with reference to FIG. 1 are denoted by the same reference numerals, and the descriptions thereof will be omitted hereinafter.

The data processor 10 is a program-controlled processor on which the following sections are implemented: link resource information update section 21; plural-path precalculation section 22; path searcher 24 including precalculated path searcher 231 and on-demand path searcher 232; and precalculated path resource information searcher 25. The memory device 11 includes link resource information memory 31 and precalculated path memory 33 including precalculated path topology memory 321, precalculated path resource information memory 322, and link-path correspondence table 323.

The link-path correspondence table 323 indicates which of precalculated paths each link is included in.

The precalculated path resource information searcher 25 receives update link information from the link resource information update section 21 and uses the update link information as a search key to search the link-path correspondence table 323 for a corresponding precalculated path. Thereafter, the precalculated path resource information searcher 25 searches the link resource information memory 31 for link resource information of the corresponding precalculated path and, if found, then updates the path resource information stored in the precalculated path resource information memory 322. Accordingly, the link resource information is updated and, at the same time, the path resource information of the corresponding precalculated path is also updated.

Operation

Referring to FIG. 5, when receiving link resource information from another node (step B0), the link resource information update section 21 identifies a link on which a change of resource information occurs (step B1) and updates corresponding link resource information stored in the link resource information memory 31 (step B2).

In addition, the precalculated path resource information searcher 25 uses the changed link information as a search key to search the link-path correspondence table 323 for a corresponding precalculated path (step F1). Thereafter, the precalculated path resource information searcher 25 searches the link resource information memory 31 for resource information of the corresponding precalculated path and updates the path resource information stored in the precalculated path resource information memory 322 (step F2). The step F2 is repeatedly performed until path resource information of all precalculated paths including the updated link have been updated (step F3).

EXAMPLE

It is here assumed that the link resource of a link a-c is changed.

As shown in FIG. 6A, the precalculated path memory 33 stores a precalculated path information table 541 which includes precalculated path topology information, precalculated path resource information, and link-path correspondence information. In this case, precalculated path information including the link a-c is shown in FIG. 6A.

When the link resource information update section 21 detects a change of resource information of the link a-c as shown in FIG. 6B, the precalculated path resource information searcher 25 updates the precalculated path information table 541 to a table 542 as shown in FIG. 6C.

Concretely, as shown in a table 551 of FIG. 6B, the delay time of the link a-c increases by 2 msec from 3 msec to 5 msec. Since delay or jitter is an additive parameter, the precalculated path resource information searcher 25 increases all delays of precalculated paths associated with the changed link a-c across the board by 2 msec (see "delay" column of the table 542 as shown in FIG. 6C).

On the other hand, the available bandwidth of the link a-c decreases from 60 Mbps to 40 Mbps. Since a bandwidth is a non-additive parameter, only available bandwidths of precalculated paths greater than 40 Mbps in the table 541 are uniformly decreased to 40 Mbps (see "BW" column of the table 542 as shown in FIG. 6C). In other words, the available bandwidth of a precalculated path is determined by the minimum bandwidth among the links included in the precalculated path. Therefore, in FIG. 6C, only the precalculated path a-c-e is not changed in available bandwidth because its original available bandwidth is 30 Mbps, smaller than 40 Mbps.

In the case where the available bandwidth increases, it is necessary to re-calculate path resource information by referring to the link resource information of each link included in a precalculated path in question.

As described above, according to the second embodiment, when the link resource information is updated, the path resource information of the corresponding precalculated paths is also updated without using the plural-path precalculation section 22. Accordingly, precalculated path selection can be performed based on the latest path resource information without the feasibility check section that is needed in the first embodiment, resulting in reduced load of computation and decreased call blocking probability.

In the first and second embodiments, the plural-path precalculation section 22 may perform precalculation based on link-inherent parameters that are independent of link resource information, such as Administrative Weight and propagation delay. In the case where parameters dependent on the above link resource information such as available bandwidth and delay are used to perform path precalculation, it is necessary to perform the precalculation every time link resource information is changed, resulting in increased load of computation. Therefore, using link-inherent parameters allows reduced computation load.

The plural-path precalculation section 22 may perform precalculation a plurality of times based on a single parameter. For example, for a destination, a path having minimum number of hops, a path having maximum available bandwidth, and a path having minimum delay time are previously calculated and stored. In this case, a path precalculation unit that was designed for a conventional communication device can be also used in the present invention, resulting in reduced time required for design.

The plural-path precalculation section 22 may perform precalculation based on an integrated parameter having a plurality of parameters including available bandwidth and delay integrated in certain proportions. For example, such an integrated parameter may be obtained by adding 1000/delay [msec] to available bandwidth[Mbps]. In this case, by performing precalculation only once, precalculated paths reflecting a plurality of parameters can be obtained, resulting in reduced computation load.

Path Selection Control

How to select a path to be used for connection setup affects efficient use of network resources, For example, among paths all satisfying the same quality requirement, one having smaller number of hops is selected to suppress resource consumption of a link, achieving efficient network utilization.

By controlling the precalculated path searcher 231, it is possible to change selecting order of a path to be used for connection setup. Several examples will be described hereafter.

Integrated Parameter

In the precalculated path searcher 231, precalculated paths are previously sorted according to a certain integrated parameter. When a connection request occurs, the precalculated path searcher 231 sequentially checks the sorted precalculated paths to find a precalculated path candidate satisfying the connection request.

Taking the case of FIGS. 3A–3G as an example, when an available bandwidth is used as an integrated parameter, the searching order of the precalculated paths 521–524 is as follows: 521, 522, 524, and 523.

In the case where a value obtained by 1000/delay[msec]+ available bandwidth [Mbps] is used as an integrated parameter, the respective integrated parameter values of the precalculated paths 521–524 are 222, 393, 530, and 216. Therefore, if these integrated parameters are sorted in descending order, then the searching order of the precalculated paths 521–524 is as follows: 523, 522, 521, and 524.

As describe above, by changing the integrated parameter, selecting order of a path candidate to be used for connection setup can be controlled, allowing the efficient utilization of network resources to be adjusted.

Weighted Round Robin

Alternatively, a precalculated path candidate to be used for connection setup may be selected in a weighted round robin fashion using an integrated parameter as a weight.

In the case where a precalculated path candidate satisfying the connection request is selected from the previously sorted precalculated paths as described before, the leading one in the previously sorted precalculated paths is used for connection setup with high probability, resulting in uneven using frequency. By using the weighted round robin scheme, using frequency is uniformly distributed among precalculated paths using the same integrated parameter.

Hierarchically Weighted Round Robin

A precalculated path candidate to be used for connection setup may be selected in a hierarchically weighted round robin fashion.

In FIG. 7, nine precalculated paths a to i to the same destination, each satisfying connection quality requirements, are shown as an example. A first group of precalculated paths a, b, and c needs three hops to the destination, a second group of precalculated paths d, e, and f needs four hops to the destination, and a third group of precalculated paths g, h, and needs five hops to the destination. The available bandwidth of each precalculated path is currently determined as shown in "available BW" column of FIG. 7.

Here, the number of hops is used as the first weight in the hierarchically weighted round robin and the available bandwidth is used as the second weight.

First, group selection is performed according to the first weight (number of hops). In this example, the first, second, and third groups are selected in proportions of 3:4:5 each corresponding to the numbers of hops thereof, respectively.

Second, in a selected group, path selection is performed according to the second weight (available bandwidth). For example, in the case of the first group (three hops) being selected, the precalculated paths a, b, and c are selected in proportions of 100:50:10 each corresponding to the available bandwidths thereof, respectively.

It is possible to designate a weight on which the round robin selection is not performed. For example, the first weight (number of hops) is not used to perform the round robin selection but to just sort the precalculated paths. In this example, a precalculated path having the smaller number of hops can be always selected.

As describe above, by changing a hierarchical weight, selecting order of a path candidate to be used for connection setup can be controlled, allowing the efficient utilization of network resources to be adjusted. Further, by using the hierarchically weighted round robin scheme, using frequency is uniformly distributed among precalculated paths.

Third Embodiment

A link state routing communication device according to a third embodiment of the present invention is designed to be used in a single peer group.

Figure 8:
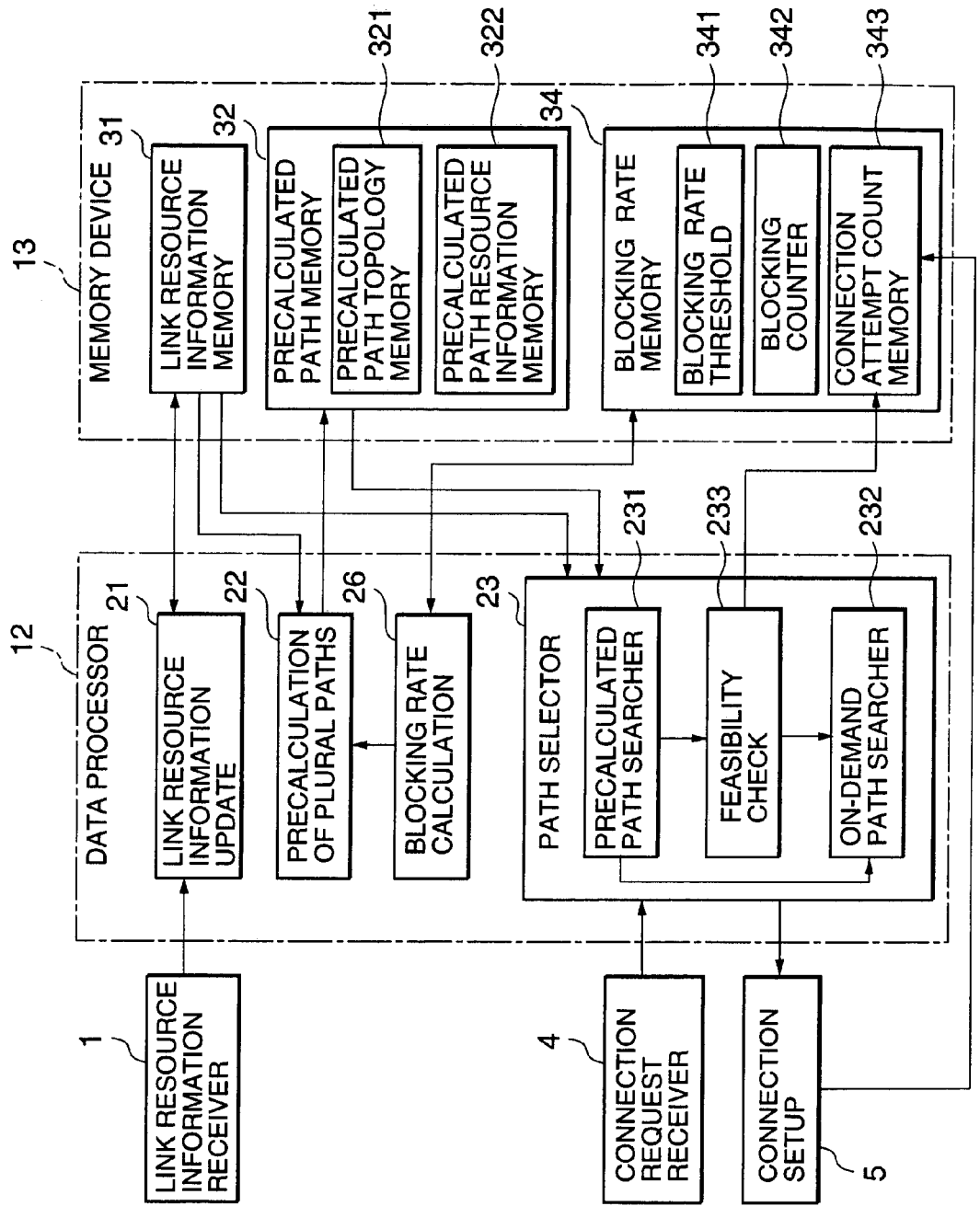
FIG. 8 is a block diagram showing a link state routing communication device according to a third embodiment of the present invention.

Referring to FIG. 8, the link state routing communication device is provided with a link resource information receiver 1, a data processor 12, a memory device 13, a connection request receiver 4, and a connection setup section 5, wherein circuit blocks similar to those previously described with reference to FIG. 1 are denoted by the same reference numerals and the descriptions thereof will be omitted hereinafter.

The data processor 12 is a program-controlled processor on which the following sections are implemented: link resource information update section 21; plural-path precalculation section 22; path searcher 23 including precalculated path searcher 231, on-demand path searcher 232, and feasibility check section 233; and blocking rate calculation section 26. The memory device 13 includes link resource information memory 31, precalculated path memory 32 including precalculated path topology memory 321 and precalculated path resource information memory 322, and blocking rate memory 34 including blocking rate threshold memory 341, blocking counter 342, and connection attempt counter 343.

Here, a blocking rate means at least one of link blocking rate and path blocking rate. A link/path blocking rate is defined as $\beta/\alpha$, where $\alpha$ is the number of times a link/path is calculated as a connection candidate and $\beta$ is the number of times the link/path does not satisfy connection quality requirements.

The blocking rate threshold memory 341 stores a threshold of link/path blocking rate, which indicates the limit of performance deterioration. The blocking counter 342 counts the number of times a link/path has been blocked. The collection attempt count memory 343 stores a feasibility counter for counting the number of times the feasibility check has been performed for a link/path and/or a connection attempt counter for counting the number of times the connection setup operation has been performed.

The blocking rate calculation section 26 calculates a link/path blocking rate by dividing the link/path blocking count stored in the blocking counter 342 by the connection attempt count stored in the connection attempt count memory 343. Then the blocking rate calculation section 26 compares the calculated link/path blocking rate with the threshold stored in the blocking rate threshold memory 341 to determine whether the link/path has been impaired. More specifically, when the calculated link/path blocking rate is greater than the blocking rate threshold, it is determined that the communication quality of the link/path is impaired, and then the plural-path precalculation section 22 performs recalculation of precalculated paths exclusive of the impaired link/path.

Operation

Figure 9:
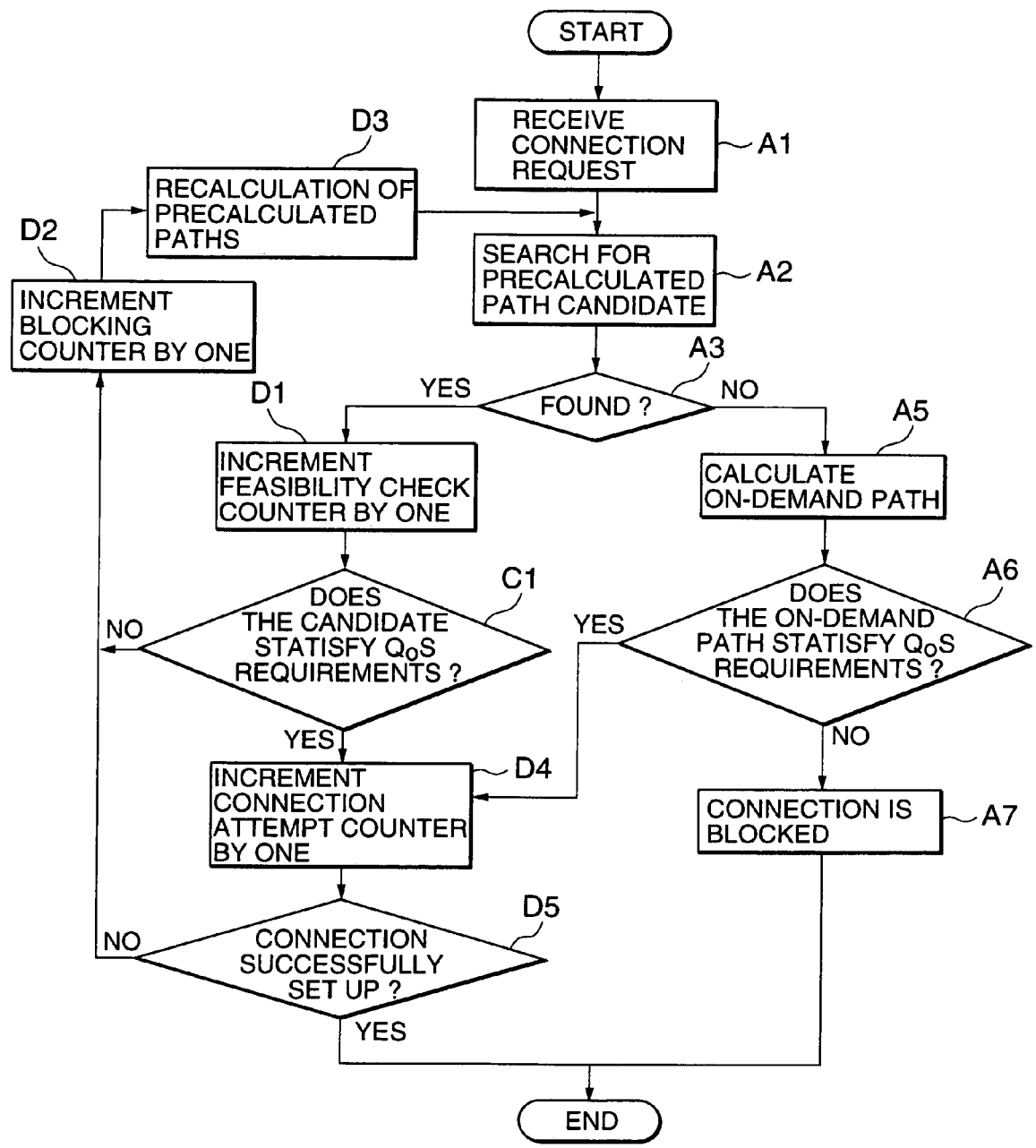
FIG. 9 is a flow chart showing an operation of the third embodiment.

Referring to FIG. 9, the steps A1–A3 and A5–A7 are the same as those in FIG. 2 and therefore the details will be omitted.

When a precalculated path candidate satisfying the required connection quality is found (YES at step A3), it is output to the feasibility check section 233 and thereby the feasibility check counter stored in the connection attempt count memory 343 is incremented by one (step D1). The feasibility check section 233 checks whether each link/path on the found path candidate satisfies the required connection quality by referring to the stored link resource information in the link resource information memory 31 (step C1).

When the found path candidate does not satisfy the required connection quality (NO at step C1), the blocking counter 343 for the link/path is incremented by one (step D2). Thereafter, the blocking rate calculation section 26 calculates a link/path blocking rate of the link/path at the time when the feasibility check is performed. When the calculated link/path blocking rate is greater than the blocking rate threshold, it is determined that the quality of the link/path is impaired, and then the plural-path precalculation section 22 performs recalculation of precalculated paths exclusive of the impaired link/path and updates the precalculated path information stored in the precalculated path memory 32 (step D3).

On the other hand, when all the links included in the found path candidate satisfy the required connection quality (YES at step C1) or when an on-demand path satisfying the required connection quality is found (YES at step A6), the found path candidate or the on-demand path is output to the connection setup section 5 and thereby the connection attempt counter is incremented by one (step D4). The connection setup section 5 attempts the connection setup based on the found path candidate. At this time, if a link does not satisfy the required connection quality (NO at step D5), the blocking counter 343 for the link/path is incremented by one (step D2).

In the step D3, recalculation of precalculated paths exclusive of the impaired link/path may be performed depending on a threshold T, which is obtained by $$T = Y \times R + (1-Y) \times S,$$

where R is a blocking rate when the feasibility check is performed and S is a blocking rate when the connection setup is attempted. In other words, T is obtained by linear interpolation from R and S.

As described above, according to the third embodiment, the link blocking rate for each link is calculated and thereby performance deterioration of a precalculated path can be detected. Therefore, it is possible to determine which portion is impaired and re-calculate precalculated paths exclusive of the impaired portion, resulting in selecting a precalculated path providing a lower blocking rate.

Fourth Embodiment

A link state routing communication device according to a fourth embodiment of the present invention is designed to be used in a single peer group.

Figure 10:
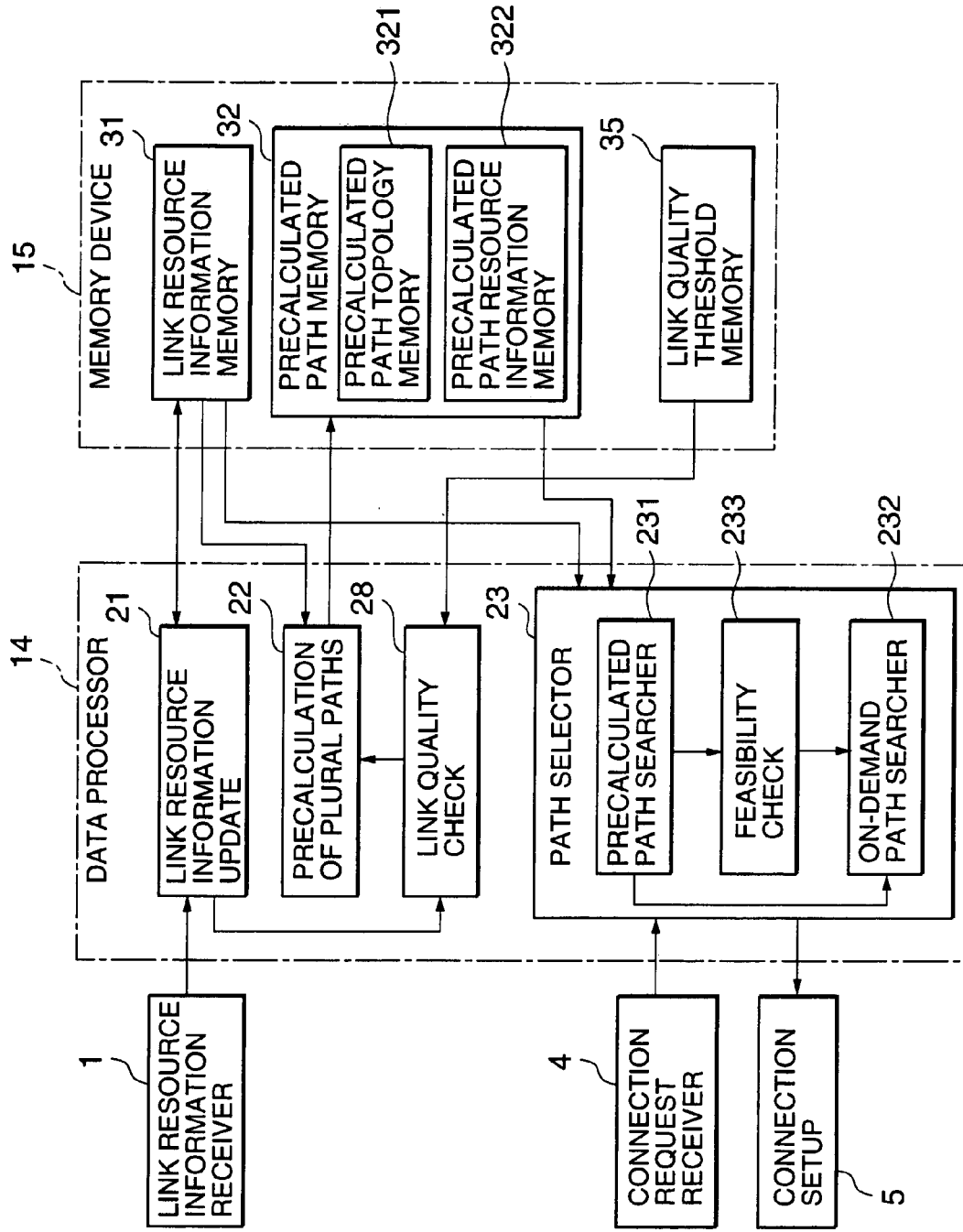
FIG. 10 is a block diagram showing a link state routing communication device according to a fourth embodiment of the present invention.

Referring to FIG. 10, the link state routing communication device is provided with a link resource information receiver 1, a data processor 14, a memory deice 15, a connection request receiver 4, and a connection setup section 5, wherein circuit blocks similar to those previously described with reference to FIG. 1 are denoted by the same reference numerals and the descriptions thereof will be omitted hereinafter.

The data processor 14 is a program-controlled processor on which the following sections are implemented: link resource information update section 21; plural-path precalculation section 22; path searcher 23 including precalculated path searcher 231, on-demand path searcher 232, and feasibility check section 231; and link quality check section 28. The memory device 15 includes link resource information memory 31, precalculated path memory 32 including precalculated path topology memory 321 and precalculated path resource information memory 322, and link quality threshold memory 35.

The link quality threshold memory 35 stores a link quality threshold indicating the permissible lowest quality for communication.

The link quality check section 28 compares updated link resource information received from the link resource information update section 21 with the link quality threshold stored in the link quality threshold memory 35 to determine whether the changed link satisfies the permissible lowest quality. If there is a link that is lower than the permissible lowest quality, the plural-path precalculation section 22 performs recalculation of precalculated paths exclusive of the impaired link.

Operation

Figure 11:
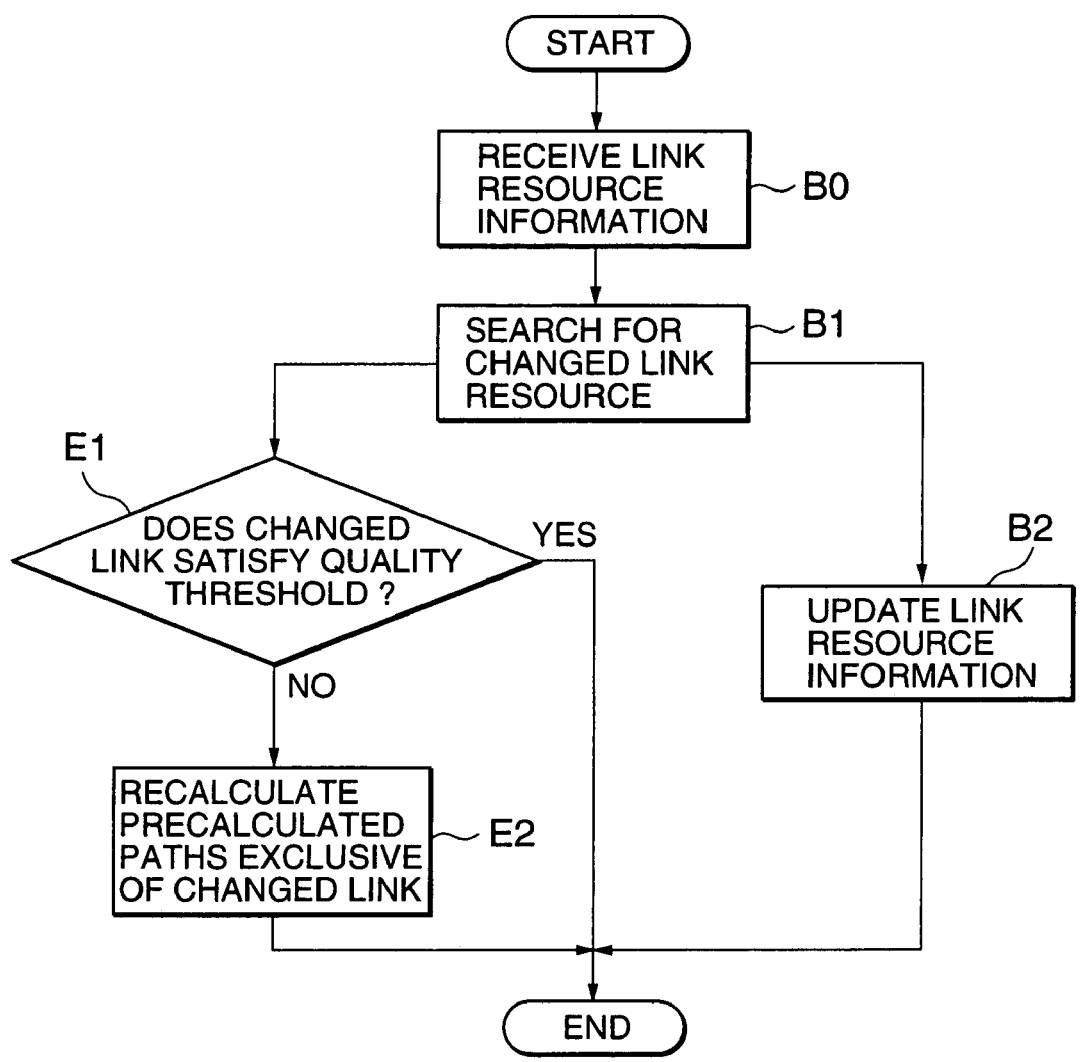
FIG. 11 is a flow chart showing an operation of the fourth embodiment.

Referring to FIG. 11, the steps B0–B2 are the same as those in FIG. 5 and therefore the details will be omitted.

The link resource information update section 21 identifies a link on which a change of resource information occurs and the updated link resource information is output to the link quality check section 28 (step B1).

The link quality check section 28 compares the updated link resource information with the link quality threshold stored in the link quality threshold memory 35 (step E1).

When the quality of updated link resource information is lower than the link quality threshold (NO at step E1), the plural-path precalculation section 22 performs recalculation of precalculated paths exclusive of the impaired link (step E2).

As described above, according to the fourth embodiment, it is possible to detect an impaired link based on the ling resource information received from the link resource information receiver 1. Therefore, when such an impaired link has been detected, precalculated paths exclusive of the impaired portion can be re-calculated, resulting in selecting a precalculated path providing a lower blocking rate.

Fifth Embodiment

A border communication device for link state routing according to a fifth embodiment of the present invention is designed to be used in a multi-level hierarchical network. Hereinafter, circuit blocks similar to those previously described with reference to FIGS. 1 and 4 are denoted by the same reference numerals and the details will be omitted.

Figure 12:
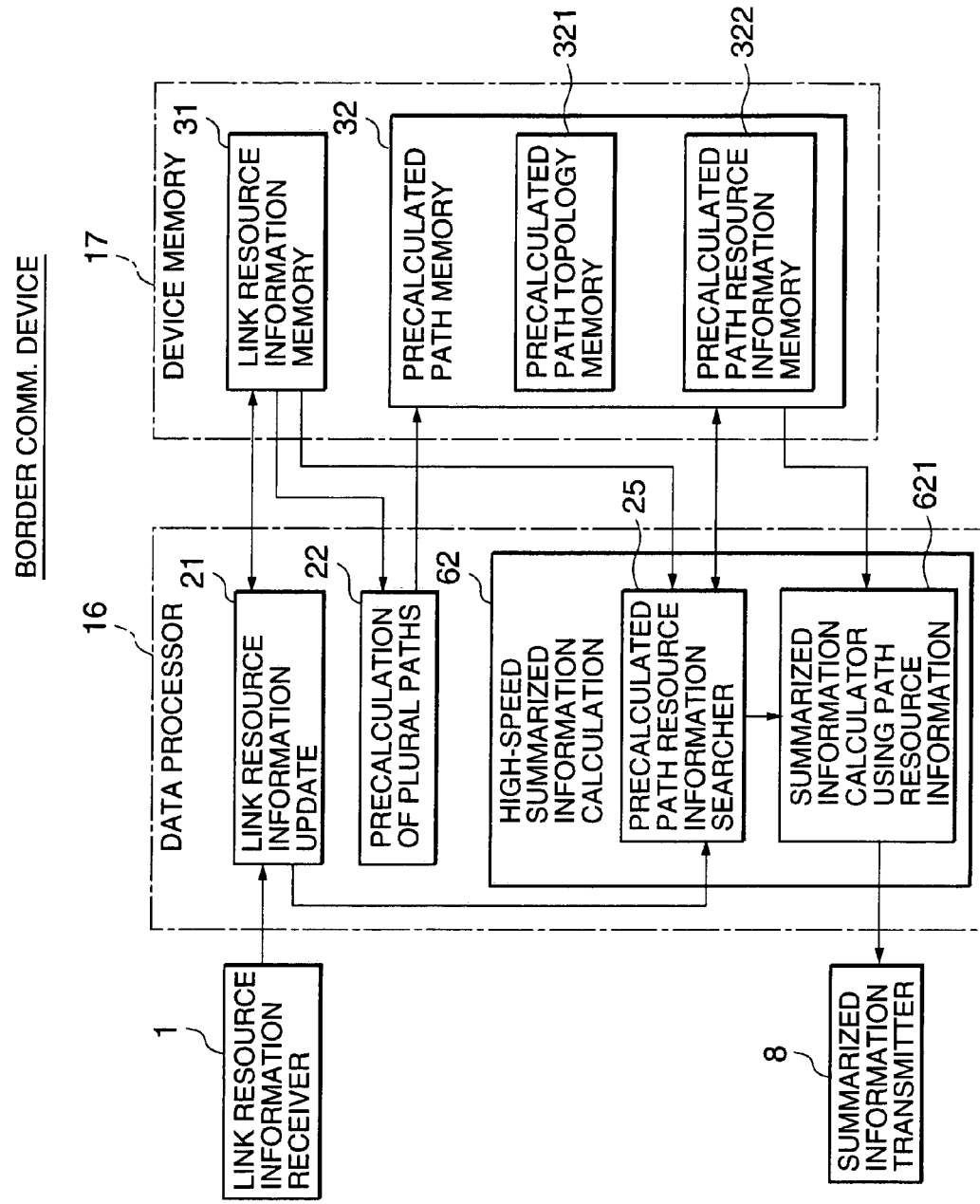
FIG. 12 is a block diagram showing a link state routing border communication device according to a fifth embodiment of the present invention.

Referring to FIG. 12, the border communication device is provided with a link resource information receiver 1, a data processor 16, a memory deice 17, and a summarized information transmitter 8. The link resource information receiver 1 receives link resource information from another communication device and outputs it to the data processor 16. The data processor 16 performs a link state routing operation using the memory device 17. The summarized information transmitter 8 transmits summarized information to different-level node under control of the data processor 16.

The data processor 16 is a program-controlled processor on which the following sections are implemented: link resource information update section 21, plural-path precalculation section 22, and high-speed summarized information calculation section 62 including precalculated path resource information searcher 25 (see FIG. 4) and summarized information calculator 621. The memory device 17 includes link resource information memory 31 and precalculated path memory 32 including precalculated path topology memory 321 and precalculated path resource information memory 322.

The summarized information calculator 621 searches the precalculated path topology memory 321 and the link resource information memory 31 for path resource information and calculates summarized information from the found path resource information. The summarized information is supplied to the summarized information transmitter 8. The high-speed summarized information calculator 62 can calculate the summarized information based on the precalculated path information at high speed.

Summarized Link State Information

Figure 13A:
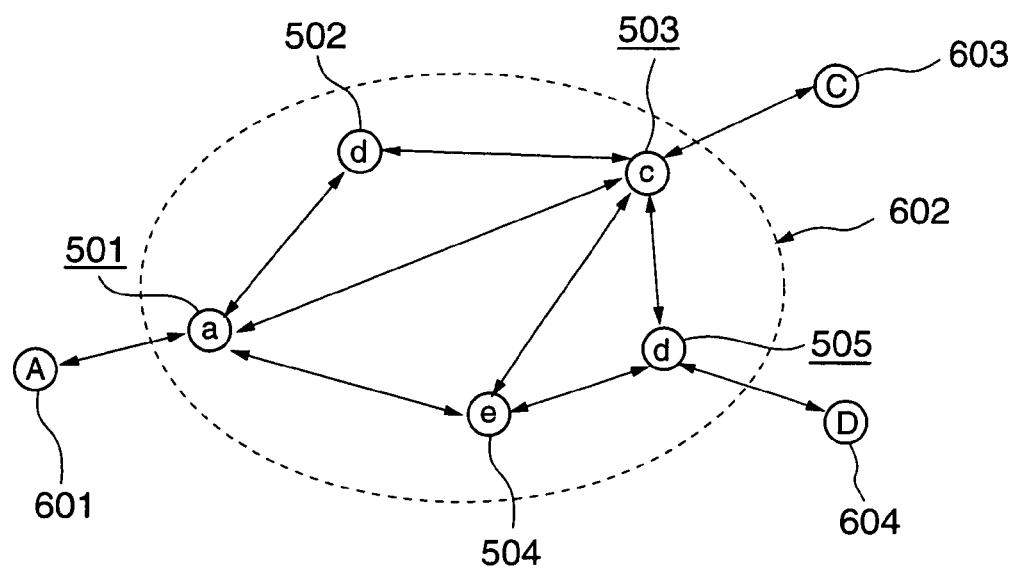
FIG. 13A is a diagram showing an example of possible network routes for explanation of the fifth embodiment.

As shown in FIG. 13A, it is assumed that a hierarchical network is composed of four levels 601, 602, 603, and 604. Here, a peer group of the level 602 consists of five nodes 501–505, in which nodes 501, 503, and 505 are border nodes connected to different levels 601, 603, and 604, respectively.

Figure 13B:
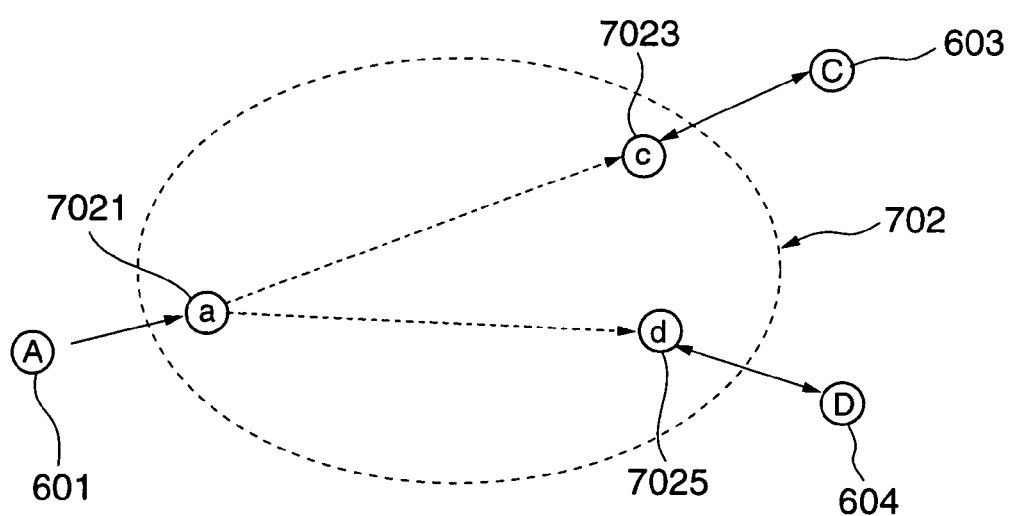
FIG. 13B is a diagram showing summarized links for explanation of the fifth embodiment.

As shown in FIG. 13B, in the case where the link resource information of the level 602 is sent to the different level 601, the link resource information of the level 602 is summarized to produce summarized information 702, which is sent from the border node 501 to the different level 601. The summarized information 702 is obtained by mapping the information of the level 602 into a network where the border nodes 503 and 505 are directly connected to the border node 501 through two summarized links. Accordingly, only the link state information of the two summarized links is sent from the border node 501 to the level 601. If such summarized information is not used, it is necessary to send link state information representing a total of seven links to the level 601.

EXAMPLE

As shown in FIGS. 14A–14E, it is assumed that a peer group of the level 602 consists of five nodes 501–505 (see FIG. 14A) and four precalculated paths 521–524 from the border node 501 to the border node 503 are considered (see FIGS. 14B–14E).

In this case, a link resource information table 511 as shown in FIG. 14F represents the link resource information of the level 602 and a precalculated path information table 531 as shown in FIG. 14G represents the precalculated paths 521–524 from the border node 501 to the border node 503. Referring to FIG. 14F, a link a-b, for example, has a delay of 3 msec and an available bandwidth (BW) of 30 Mbps. Referring to FIG. 14G, a precalculated path a-b-c, for example, has a delay of 7 msec and an available bandwidth of 80 Mbps.

Figures 15, 16:
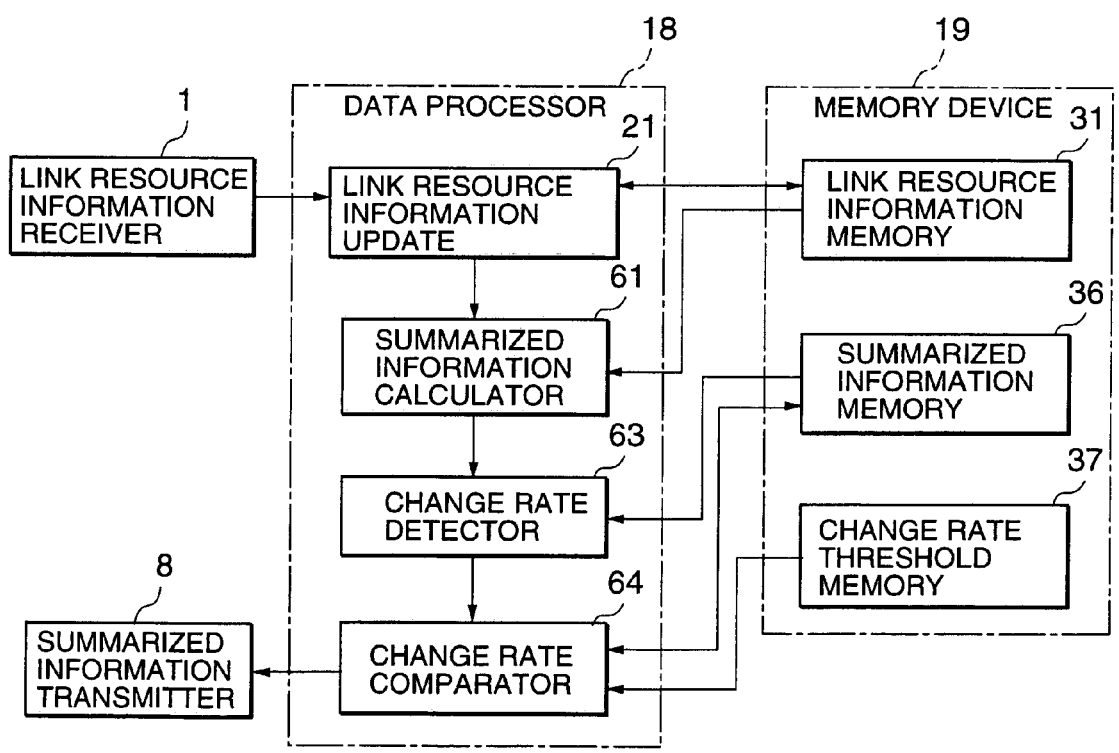
FIG. 15 is a diagram showing a summarized link resource information table for explanation of the fifth embodiment.
FIG. 16 is a block diagram showing a link state routing communication device according to a further embodiment of the present invention.

FIG. 15 shows a summarized information table 591, which is obtained from the precalculated path information table 531 and represents a summarized link from the border node 7021 to the border node 7023 as shown in FIG. 13B.

The precalculated path resource information searcher 25 searches the link resource information table 511 for resource information of the precalculated paths 521–524 to produce the precalculated path information table 531.

The summarized information calculator 621 searches the precalculated path information table 531 for precalculated path information appropriate to summarized link information between the border nodes 501 and 503.

For example, when the best value is selected from the precalculated path resource information, the policy best value (delay: 2 msec and available bandwidth: 80 Mbps) is selected as summarized link resource information (see the table 591 of FIG. 15). When the worst value is selected from the precalculated path resource information, the policy worst value (delay: 7 msec and available bandwidth: 3 Mbps) is selected as summarized link resource information (see the table 591 of FIG. 15).

In the case of linear interpolation from the best and worst values, the delay time and the available bandwidth (BW) are represented by the following expressions:

Delay: $2X+7(1-X)$[msec]; and

Available $BW$: $80X+30(1-X)=30+50X$ [Mbps], where X is a real number between 0 and 1 (see the table 591 of FIG. 15).

Similarly, the summarized information calculator 621 can determine other summarized link state information (here, between the border nodes 501 and 505).

Since summarized information is calculated using precalculated paths, high-speed processing can be achieved.

Sixth Embodiment

A border communication device according to a sixth embodiment is provided with a precalculated path memory 33 including a link-path correspondence table 323 as shown in FIG. 4, in place of the precalculated path memory 32 of FIG. 12.

As described before, the link-path correspondence table 323 indicates which of precalculated paths each link is included in.

The precalculated path resource information searcher 25 receives update link information from the link resource information update section 21 and uses the update link information as a search key to search the link-path correspondence table 323 for a corresponding precalculated path. Thereafter, the precalculated path resource information searcher 25 searches the link resource information memory 31 for link resource information of the corresponding precalculated path and, if found, then updates the path resource information stored in the precalculated path resource information memory 322. Accordingly, the link resource information is updated and, at the same time, the path resource information of the corresponding precalculated path is also updated. In other words, when the link resource information is updated, only the path resource information of the corresponding precalculated path is re-calculated, resulting in reduced number of computation times and thereby decreased computation load.

Seventh Embodiment

A border communication device for link state routing according to a seventh embodiment of the present invention is designed to be used in a multi-level hierarchical network. Hereinafter, circuit blocks similar to those previously described with reference to FIG. 1 are denoted by the same reference numerals and the details will be omitted.

Referring to FIG. 16, the border communication device is provided with a link resource information receiver 1, a data processor 18, a memory deice 19, and a summarized information transmitter 8. The link resource information receiver 1 receives link resource information from another communication device and outputs it to the data processor 18. The data processor 18 performs a link state routing operation using the memory device 19. The summarized information transmitter 8 transmits summarized information to different-level node under control of the data processor 18.

The data processor 18 is a program-controlled processor on which the following sections are implemented: link resource information update section 21; summarized information calculation section 61; change rate detector 63; and change rate comparator 64. The memory device 19 includes link resource information memory 31, summarized information memory 36, and change rate threshold memory 37.

The summarized information memory 36 stores summarized information that was previously sent to a different-level node.

The change rate threshold memory 37 stores a change rate threshold which is used to determine whether summarized information should be sent to a different-level node.

The change rate detector 63 compares new summarized information received from the summarized information calculator 61 with the stored summarized information that was previously sent to a different-level node to produce a change rate of summarized information. The new summarized information and the calculated change rate are output to the change rate comparator 64.

The change rate comparator 64 compares the calculated change rate with the change rate threshold stored in the change rate threshold memory 37 to determine whether old summarized information should be replaced with the new summarized information. More specifically, when the calculated change rate is greater than the change rate threshold, the change rate comparator 64 updates the stored summarized information of the summarized information memory 36 into the new summarized information and outputs the new summarized information to the summarized information transmitter 8.

Operation

Figure 17:
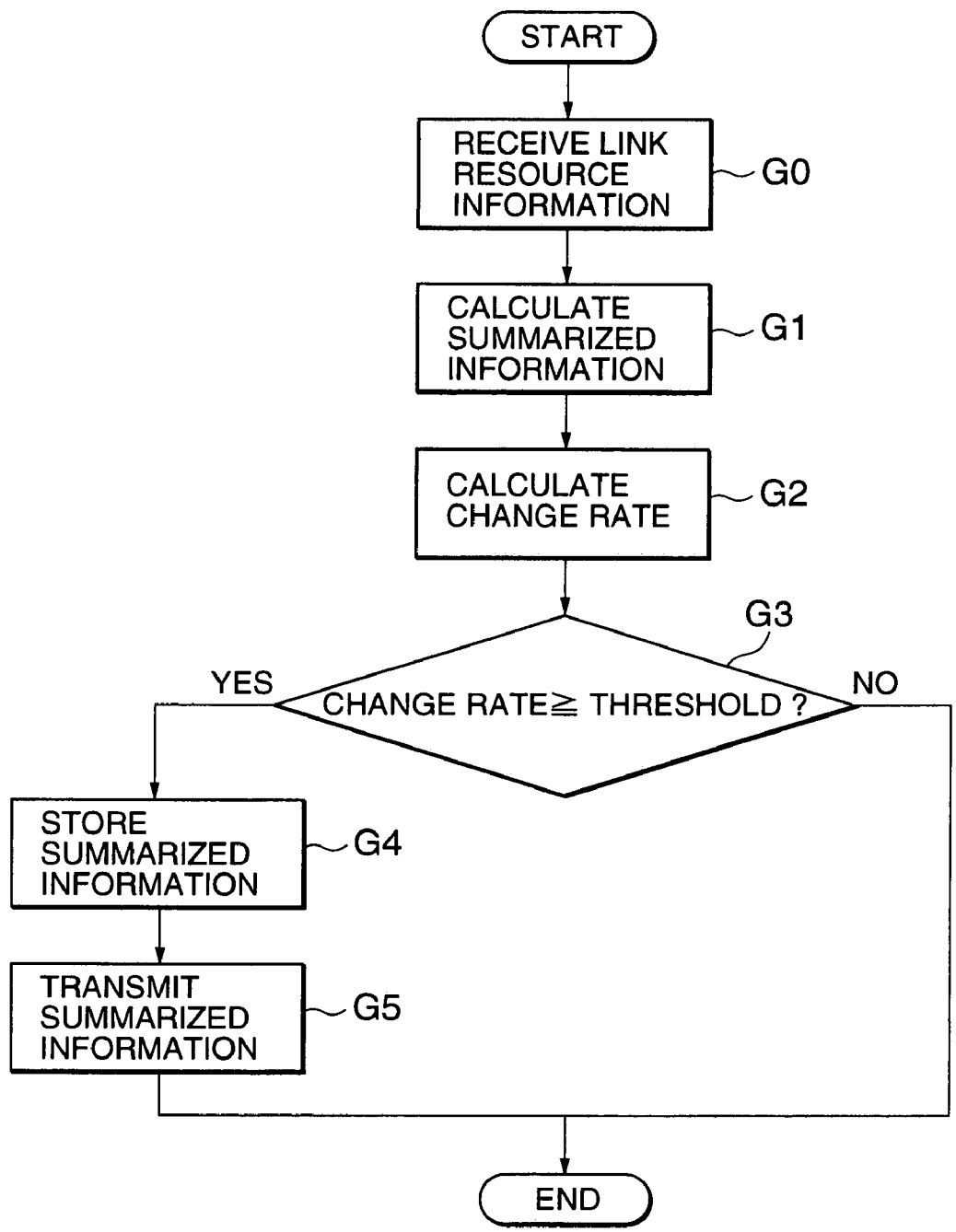
FIG. 17 is a flow chart showing an operation of the further embodiment.

Referring to FIG. 17, when the link resource information update section 21 receives link resource information from the link state resource information receiver 1 (step G0), the summarized information calculator 61 calculates new summarized information obtained by summarizing network status of nodes in its own level while referring to the contents of the link resource information memory 31 (step G1). The new summarized information is output to the change rate detector 63.

The change rate detector 63 compares the new summarized information with the previously summarized information stored in the summarized information memory 36 to produce a change rate of summarized information (step G2). The calculated change rate is output to the change rate comparator 64.

The change rate comparator 64 compares the calculated change rate with the change rate threshold stored in the change rate threshold memory 37 (step G3). When the calculated change rate is equal to or greater than the change rate threshold (YES at step G3), it is determined that a large amount of change occurs. In this case, the change rate comparator 64 updates the stored summarized information in the summarized information memory 36 into the new summarized information (step G4) and outputs the new summarized information to the summarized information transmitter 8 (step G5).

Contrarily, when the calculated change rate is smaller than the change rate threshold (NO at step G3), it is determined that a small amount of change occurs and the process is terminated without sending calculated summarized information.

EXAMPLE

FIG. 18A shows a table 581 containing link resource information of the link a-e in the level 602 as shown in FIG. 13A. FIG. 18B shows a table 582 containing information of precalculated paths: first precalculated path from node 501 to node 503; and second precalculated path from node 501 to node 505. Such information of precalculated paths is used to calculate summarized information of the level 602. FIG. 18C shows a table 583 containing summarized information of the level 602 that is calculated from the table 582.

It is assumed that the delay time of the link a-e is changed from 1 msec to 3 msec and the available bandwidth thereof is changed from 50 Mbps to 20 Mbps.

The summarized information calculator 61 first updates precalculated path resource information as shown in the table 582 of FIG. 18B. Thereafter, the summarized information calculator 61 changes summarized information based on the updated precalculated path resource information as shown in the table 583 of FIG. 18C.

The change rate detector 63 calculates a change rate of summarized information. Here, the following expression is used to calculate a change rate of summarized information:

$$|R_{org} - R_{last}|/R_{last},$$

where $R_{org}$ is a resource value before updated and $R_{last}$ is a resource value after updated.

A change rate of entire summarized information can be obtained, for example, by summing change rates of all summarized links included therein. A change rate of a summarized link can be obtained, for example, by summing change rates of resource information of respective links to be summarized.

In the case where a policy of selecting a best value is employed, the summarized link a-c provides a delay change rate of 33% and an available bandwidth change rate of 0% (see the table 583 of FIG. 18C) and therefore a total of change rates in the summarized link a-c is 33%=33%+0%. Similarly, the summarized link a-d provides a delay change rate of 20% and an available bandwidth change rate of 0% (see the table 583 of FIG. 18C) and therefore a total of change rates in the summarized link a-c is 20%=20%+0%. Accordingly, a change rate of entire summarized information is 53% which is obtained by summing the calculated change rates of the summarized links, that is, 33%+20%=53%.

On the other hand, in the case where a policy of selecting a worst value is employed, the summarized link a-c provides a delay change rate of 13% and an available bandwidth change rate of 50% (see the table 583 of FIG. 18C) and therefore a total of change rates in the summarized link a-c is 63%=13%+50%. Similarly, the summarized link a-d provides a delay change rate of 0% and an available bandwidth change rate of 50% (see the table 583 of FIG. 18C) and therefore a total of change rates in the summarized link a-c is 50%=0%+50%. Accordingly, a change rate of entire summarized information is 113% which is obtained by summing the calculated change rates of the summarized links, that is, 63%+50%=113%.

As described above, a change rate is calculated by comparing calculated summarized information with the stored summarized information that was previously sent to the different-level node. Only if a large amount of change occurs, that is, the calculated change rate is greater than the threshold, the summarized information is sent to a different-level node, resulting in reduced amount of summarized information transferred in the network.

The invention claimed is:

1. A link state routing device of a node in a network comprising a plurality of nodes and links, said link state routing device comprising:
    a first memory for storing link resource information for each link in the network, wherein the link resource information is updated as an occasion to do so arises;
    a path calculator for calculating a plurality of precalculated paths from a source node to at least one destination node based on link resource information stored in the first memory, independently of occurrence of a connection request;
    a second memory for storing the precalculated paths and path resource information for each precalculated path;
    a path selector for selecting a precalculated path from the precalculated paths stored in the second memory when a connection request occurs, wherein the precalculated path is selected so as to satisfy a quality requirement of the connection request;
    a connection setup attempter for attempting connection setup of the precalculated path;
    a first counter for counting the number of path selection occurrences in the path selector;
    a second counter for counting the number of path blocking occurrences in the connection setup attempter;
    a blocking rate calculator for calculating a blocking rate based on the counted number of path selection occurrences and the counted number of path blocking occurrences; and
    a controller controlling the path calculator such that, when the blocking rate is not smaller than a predetermined threshold, the path calculator recalculates a plurality of precalculated paths for each destination node based on link resource information stored in the first memory.

2. The link state routing device according to claim 1, wherein the path selector comprises:
    a precalculated path searcher for searching the second memory for a precalculated path candidate satisfying the quality requirement of the connection request; and
    a feasibility checker for checking whether the precalculated path candidate comprises a feasible path, by referring to link resource information stored in the first memory,
    wherein, when the precalculated path candidate comprises an infeasible path, the precalculated path searcher searches the second memory for another precalculated path candidate.

3. The link state routing device according to claim 2, wherein the path selector further comprises:
    an on-demand path searcher for searching the first memory for a path candidate satisfying the quality requirement of the connection request,
    wherein, when a precalculated path candidate satisfying the quality requirement of the connection request is not found, the on-demand path searcher is activated.

4. The link state routing device according to claim 2, wherein the blocking rate calculator calculates a blocking rate based on the counted number of feasibility check occurrences and the counted number of path blocking occurrences.

5. The link state routing device according to claim 1, further comprising:
    an updater for updating the path resource information of a precalculated path stored in the second memory when link resource information of a link included in the precalculated path is updated.

6. The link state routing device according to claim 5, wherein the path selector further comprises:
    an on-demand path searcher for searching the first memory for a path candidate satisfying the quality requirement of the connection request,
    wherein, when a precalculated path candidate satisfying the quality requirement of the connection request is not found, the on-demand path searcher is activated.

7. The link state routing device according to claim 5, further comprising a controller controlling the path calculator such that, when the updated link resource information of the link is not smaller than a predetermined link quality threshold, the path calculator recalculates a plurality of precalculated paths for each destination node exclusive of the updated link resource information of the link.

8. The link state routing device according to claim 1, wherein the path calculator calculates a plurality of precalculated paths for each destination node based on a link-inherent parameter that is independent of link resource information.

9. The link state routing device according to claim 1, wherein the path calculator calculates a precalculated path based on a single parameter a plurality of times to produce a plurality of precalculated paths for each destination node.

10. The link state routing device according to claim 1, wherein the path calculator calculates a plurality of precalculated paths for each destination node based on an integrated parameter set having a plurality of parameters integrated therein.

11. The link state routing device according to claim 10, wherein the path selector sorts the precalculated paths stored in the second memory according to the integrated parameter set to search the second memory for a precalculated path satisfying the quality requirement of the connection request.

12. The link state routing device according to claim 11, wherein the path selector searches the second memory for a precalculated path satisfying the quality requirement of the connection request in a round robin fashion weighted by the integrated parameter set.

13. The link state routing device according to claim 12, wherein the path selector searches the second memory for a precalculated path satisfying the quality requirement of the connection request in a round robin fashion hierarchically weighted by the integrated parameter set.

14. The link state routing device according to claim 1, wherein the link resource information comprises delay information and available bandwidth information.

15. The link state routing device according to claim 1, wherein the path selector further comprises:
an on-demand path searcher for searching the first memory for a path candidate satisfying the quality requirement of the connection request,
wherein, when a precalculated path candidate satisfying the quality requirement of the connection request is not found, the on-demand searcher is activated.

16. A communication method in a link state routing device of a node in a network comprising a plurality of nodes and links, said method comprising:
storing link resource information for each link in the network in a first memory;
updating the link resource information as an occasion to do so arises;
calculating a plurality of precalculated paths from a source node to at least one destination node based on link resource information stored in the first memory, independently of occurrence of a connection request;
storing the precalculated paths and path resource information for each precalculated path in a second memory;
selecting a precalculated path from the precalculated paths stored in the second memory when a connection request occurs, wherein the precalculated path is selected so as to satisfy a quality requirement of the connection request;
attempting connection setup of the precalculated path:
counting the number of path selection occurrences in the path selector;
counting the number of path blocking occurrences during the attempting of the connection setup;
calculating a blocking rate based on the counted number of path selection occurrences and the counted number of path blocking occurrences; and
when the blocking rate is not smaller than a predetermined threshold, recalculating a plurality of the precalculated paths for each destination node based on link resource information stored in the first memory.

17. The method according to claim 16, wherein selecting the precalculated path comprises:
searching the second memory for a precalculated path candidate satisfying the quality requirement of the connection request; and
checking whether the precalculated path candidate comprises a feasible path, by referring to link resource information stored in the first memory,
wherein, when the precalculated path candidate comprises an infeasible path, the second memory is searched for another precalculated path candidate.

18. The method according to claim 16, further comprising:
updating the path resource information of a precalculated path stored in the second memory when link resource information of a link included in the precalculated path is updated.

19. The method according to claim 16, further comprising:
updating path resource information of a precalculated path stored in the second memory when link resource information of a link included in the precalculated path is updated; and
when the update link resource information of the link is not smaller than a predetermined link quality threshold, recalculating a plurality of precalculated paths for each destination node exclusive of the updated link resource information of the link.

20. The method according to claim 16, wherein the link resource information comprises delay information and available bandwidth information.

* * * * *